United States Patent
Suwa et al.

[11] Patent Number: 5,888,458
[45] Date of Patent: Mar. 30, 1999

[54] MELTING FURNACE OF METALS AND MELTING METHOD THEREOF

[75] Inventors: Toshio Suwa; Nobuaki Kobayashi; Hiroshi Igarashi; Kimio Iino; Yoshiteru Kikuchi; Yasuyuki Yamamoto, all of Yamanashi, Japan

[73] Assignees: Nippon Sanso Corporation; NKK Corporation, both of Tokyo, Japan

[21] Appl. No.: 817,045

[22] PCT Filed: Aug. 7, 1996

[86] PCT No.: PCT/JP96/02228

§ 371 Date: Apr. 4, 1997

§ 102(e) Date: Apr. 4, 1997

[87] PCT Pub. No.: WO97/06394

PCT Pub. Date: Feb. 20, 1997

[30] Foreign Application Priority Data

| Aug. 8, 1995 | [JP] | Japan | 7-202508 |
| Aug. 8, 1995 | [JP] | Japan | 7-202521 |
| Aug. 8, 1995 | [JP] | Japan | 7-202526 |
| Sep. 8, 1995 | [JP] | Japan | 7-203617 |
| Sep. 8, 1995 | [JP] | Japan | 7-203619 |
| Sep. 8, 1995 | [JP] | Japan | 7-203624 |

[51] Int. Cl.$^6$ ........................ F27D 13/00
[52] U.S. Cl. ............... 266/44; 266/200; 266/212; 266/900
[58] Field of Search ............. 266/200, 212, 266/900, 901, 44

[56] References Cited

U.S. PATENT DOCUMENTS

| 2,161,180 | 6/1939 | Marx . | |
| 2,283,163 | 5/1942 | Brassert et al. | 266/900 |
| 4,291,634 | 9/1981 | Bergsten et al. | 266/900 |
| 4,556,418 | 12/1985 | Syska | 266/900 |

FOREIGN PATENT DOCUMENTS

| 0 031 160 A1 | 7/1981 | European Pat. Off. . |
| 0 291 701 | 11/1988 | European Pat. Off. . |
| 0 571 732 A2 | 12/1993 | European Pat. Off. . |
| 24 27 360 | 1/1975 | Germany . |
| 56-501810 | 12/1981 | Japan . |
| 59-103025 | 7/1984 | Japan . |
| 59-150005 | 8/1984 | Japan . |
| 1-215919 | 8/1989 | Japan . |
| 2-93012 | 4/1990 | Japan . |
| 3-3122 | 1/1991 | Japan . |
| 5-271804 | 10/1993 | Japan . |
| 5-271807 | 10/1993 | Japan . |
| 6-323733 | 11/1994 | Japan . |
| 7-43096 | 5/1995 | Japan . |

*Primary Examiner*—Scott Kastler
*Attorney, Agent, or Firm*—Armstrong, Westerman, Hattori, McLeland and Naughton

[57] ABSTRACT

Disclosed is a melting furnace of metals and melting method thereof, which can control the rate at which a metallic raw material is introduced from a preheating section to a melting section within an optimum range and which can achieve efficient melting of the metallic raw material using oxygen burners only. The metal melting furnace has a melting section (22) provided with oxygen burners (21) and a preheating section (23) for preheating the metallic raw material located above the melting section, with a reduced section (24), having an inner diameter smaller than those of the melting section (22) and of the preheating section (23), being located between the melting section (22) and the preheating section (23).

15 Claims, 12 Drawing Sheets

MELTING FURNACE OF METALS AND MELTING METHOD THEREOF

TECHNICAL FIELD

This invention relates to a melting furnace of metals, for example, scraps or ores of iron, copper, aluminum, etc. and to melting method of these metals, using oxygen burners only to which oxygen or oxygen-rich air is supplied as a combustion assisting gas.

BACKGROUND ART

There are known metal melting furnaces in which fossil fuels are burned with burners using oxygen or oxygen-rich air as a combustion assisting gas, and scraps or ores of iron, copper, aluminum, etc. are melted by the heat of combustion thus generated. Such melting furnaces are described, for example, in Japanese Unexamined PCT Publication No. 501810/1981, and Japanese Unexamined Patent Publication Nos. 215919/1989, 93012/1990, 271804/1993 and 271807/1993.

While these melting furnaces generally are each provided with a melting section where a metallic raw material is melted using oxygen burners and a preheating section where the metallic raw material is preheated, the preheating section is located, in the melting furnaces described in Japanese Unexamined PCT Publication No. 501810/1981 and Japanese Unexamined Patent Publication No. 215919/1989, above the melting section via a closing grid so as to preheat a next charge of metallic raw material on the grid. However, in the metal melting furnace having such iron grid above the melting section, the iron grid is exposed to high temperature, so that it must be cooled with water and the like, causing a great heat loss. These melting furnaces further involve problems of water leakage, troubles in opening and closing the iron grid, etc. due to severe environment to which the melting furnace is exposed.

Meanwhile, in the melting furnace described in Japanese Unexamined Patent Publication No. 271807/1993, which is a so-called reverberatory furnace, a metallic raw material is introduced gravitationally into the melting section while it is preheated by the discharge gas from the melting section when the metallic raw material passes through a slant passage defined in the wall of the furnace. In this case, however, the hot discharge gas tends to flow the upper space of the slant passage serving as the preheating section, so that it is difficult to preheat fully the metallic raw material falling through the lower part of the slant passage, and it is also difficult to control the falling speed of the metallic raw material, because the material is introduced by natural fall.

Generally, in a melting furnace integrated with the preheating section where the metallic raw material is preheated, the rate of introducing the metallic raw material from the preheating section into the melting section significantly influences the heat efficiency. More specifically, the metallic raw material is preferably introduced at the same rate as it is melted in the melting section. If the introducing rate is too high, the large amount of unmelted metal remains as a mixture with the molten metal at the bottom of the melting section, and further there may occur a phenomenon that the molten metal resumes the solid state due to heat loss from the bottom of the furnace. On the other hand, if the introducing rate is too low, it takes much time for introducing the metallic raw material to consume extra energy.

After the metallic raw material is melted in the metal melting furnace, the molten metal in the melting section must be tapped into a ladle and the like. In the case of a relatively small melting furnace, the entire furnace is designed to be tilted to tap the molten metal from a tapping port provided on one side of the melting section. However, in the case of a large melting furnace, since there are problems of securing space for tilting the entire furnace and installation of a large driving mechanism for tilting the furnace, the tapping port is provided at the bottom of the melting section to tap the molten metal through Accordingly, the structure of the melting section is complicated, so that not only the production cost is increased but also maintenance of refractory materials and the like also costs high.

Further, while such metal melting furnaces are generally constructed using large amounts or refractory materials, since the unit requirement of refractory materials which are liable to be damaged influences the melting cost, a water cooling system is incorporated in the case of an electric furnace to cool the furnace using a water-cooling jacket excluding the bottom of the furnace with which the molten metal is brought into contact. The reason why incorporation of such water-cooling system is successful is that, in the structure of the electric furnace, the furnace wall is formed substantially perpendicularly, that the ceiling of the furnace is spaced high away from the furnace bottom, so that there occurs small heat loss even if such water-cooling jacket is used. Meanwhile, in a melting furnace for melting metals using oxygen burners, e.g., the metal melting furnace described in Japanese Unexamined PCT Publication No. 501810/1981, the furnace is partly water-cooled. However, the water-cooled part is only the perpendicular wall of the furnace.

As described above, when water cooling system is incorporated into the metal melting furnace, the part to be water-cooled is limited. Particularly, in the metal melting furnace employing oxygen burners and having a small distance from the surface of the bath of molten metal to the ceiling of the furnace, heat is radiated in large amounts from the molten metal and the burners, and a great heat loss occurs if such water-cooling system is incorporated, impelling use or refractory materials. However, since the melting furnace employing refractory materials is subjected to great thermal shocks in the step of melting the metallic raw material, the frequency that the refractory materials are damaged is increased, increasing the unit requirement of the refractory material and thus influencing the melting cost greatly. Further, it is extremely laborious to form the oxygen burner insertion holes and repair thereof.

Further, in the metal melting furnace employing oxygen burners, fitting positions of the oxygen burners and the directions of injecting flames also significantly influence heat efficiency. More specifically, in melting a metallic raw material using oxygen burners, not only speedy melting of raw material directly by the flames but also preheating of the metallic raw material by the combustion gas are achieved. Accordingly, in order to enhance the heat efficiency, it is essential to carry out preheating of the material fully with the combustion gas and to melt the preheated material speedily by the high-temperature flames, and what is important here is to keep good balance among the melting rate, the preheating rate and the rate of introducing the metallic raw material from the preheating section to the melting section.

For example, although melting performance can be improved by allowing the flames of the oxygen burners to face toward the furnace bottom to some degree, it is almost impossible in an actual melting furnace to attach the oxygen burners to the furnace wall at steep angles approximate to the perpendicular so as to inject flames therefrom toward the bottom of the furnace, and thus the fitting angle of the oxygen burners at the furnace wall has been limited to 10 to 20 degrees with respect to the horizontal, because of the difficulty in forming the burner insertion holes, interference between the attachments of the oxygen burners and the outer wall surface of the furnace. Accordingly, dead zones are liable to be present around the periphery in the furnace, making it difficult to heat the metallic raw material uniformly.

Further, when a metallic raw material is to be melted with the flames of oxygen burners provided above the bath surface, heat can be transferred advantageously to the metallic raw material or the material to be heated in the melting section, since the material to be heated assuming the solid state at the initial stage has a relatively low temperature. However, in the state of liquid or solid-liquid mixture in the middle and later stages of the melting process, not only the temperature of the material to be heated is elevated, but also the heat is transferred only to the surface of the bath and not into the bath, achieving very poor heat transfer. Accordingly, it is a key to improvement in the efficiency of melting metallic raw materials only with oxygen burners to improve heat transfer characteristics at the middle and later stages of the melting process.

Under such circumstances, Japanese Unexamined Patent Publication No. 271804/1993 proposes, as a method of efficiently transferring heat from high-temperature flames formed by combustion at burners to a material to be heated, to allow flames formed by the oxygen burners to impinge upon the material to be heated. However, no matter how the conditions under which the flames are allowed to impinge upon the material to be heated are optimized, the heat transfer area cannot be increased so much, because the bath surface becomes relatively smooth at the middle and later stages of melting, and the gas impinging upon the material to be heated and reflected thereby still has a high temperature, leading to heat loss.

Therefore, it is a first objective of this invention to provide a metal melting furnace which can control the rate of introducing a metallic raw material from the preheating section to the melting section to be within an optimum range, and which can achieve efficient melting of the metallic raw material with oxygen burners only.

It is a second objective of this invention to provide a metal melting furnace which can achieve efficient melting of the metallic raw material with oxygen burners only by preheating the metallic raw material efficiently, and which can facilitate tapping of the molten metal.

It is a third objective of this invention to provide a metal melting furnace which can achieve efficient melting of the metallic raw material with oxygen burners only, and which can reduce unit requirement of refractory materials by introducing a water-cooling system to the portions, to be subjected to high heat load, where oxygen burner insertion holes etc. are defined.

It is a fourth objective of this invention to provide a melting furnace of metals and melting method thereof, which can control the rate of introducing a metallic raw material from the preheating section to the melting section to be within an optimum range, and which can achieve efficient melting of the metallic raw material by well-balanced utilization of the flames formed by combustion at the oxygen burners for melting and preheating the metallic raw material.

It is a fifth objective of this invention to provide a method of melting metals which can transfer efficiently the heat of flames formed by the oxygen burners even at the middle and later stages of melting where the metallic raw material is melted to some degree, and which can achieve efficient melting of the metallic raw material with the oxygen burners only.

DISCLOSURE OF THE INVENTION

The metal melting furnace according to this invention is a melting furnace for melting a metallic raw material with flames of oxygen burners and has a melting section provided with an oxygen burner, a preheating section for preheating the metallic raw material located above the melting section, and a reduced section, having an inner diameter smaller than those of the melting section and of the preheating section, located between the melting section and the preheating section.

As described above, by providing the reduced section between the melting section and the preheating section, the charging rate of the raw material preheated in the preheating section and falling spontaneously into the melting section can be controlled to effect efficient melting of scraps, ores, etc. of various metals with the oxygen burners only, enabling reutilization of various scraps at low costs.

Particularly, referring to the relationship between the cross-sectional area of the preheating section and that of the reduced section, by allowing the preheating section to have a cross-sectional area of 1.4 to 5 times, preferably 1.5 to 4 times, as large as that of the reduced section, the metallic raw material can be introduced to the melting section at an optimum falling speed (charging rate). Further, since the state that the metallic raw material is preheated in the preheating section changes depending on the relationship between the volume of the preheating section and that of the melting section, a high heat efficiency of 50% or more can be achieved even in a small melting furnace by allowing the preheating section to have a substantial volume of 0.4 to 3 times, preferably 0.5 to 2 times, as large as that of the melting section.

Further, by designing the melting section and the preheating section to be separable from each other at or around the reduced section, the molten metal can be tapped by separating the melting section from the preheating section and tilting the melting section only, so that the entire furnace need not be tilted and that tapping operation can be performed easily within a limited space. Accordingly, even if the height of the metal melting furnace is increased by providing the reduced section and the preheating section above the melting section, the molten metal need not be tapped from the bottom of the furnace, but the tapping operation can be performed by minimum tilting operating. Particularly, if the splitting section for separating the melting section from the preheating section is made of a refractory material or is provided with a water-cooling jacket, damage of the splitting section can be avoided.

Further, heat loss to be caused by water cooling can be minimized by forming a water-cooling jacket at a portion upper than the furnace wall of the melting section; setting the angle of the inner wall surface of the water-cooling jacket extended from the top of that furnace wall to the reduced section within the range of 20 to 60 degrees with respect to the horizontal; and allowing the oxygen burners to penetrate the water-cooling jacket into the melting section, thus achieving melting of the metal efficiently. In addition, since the thus incorporated water-cooling jacket is free from the problem of the damage of refractory material, the unit requirement of the refractory material can be reduced on a great margin, leading to reduction in the melting cost as a whole.

Further, by allowing the flame of the oxygen burner to be injected toward a circle drawn, on the bottom of the melting section, on a point located at a distance of 0.2 times the distance, between the center of gravity and the inner wall surface where the oxygen burner is fitted, closer from the center of gravity toward that inner wall surface and by setting the circle to have a diameter of 0.6 times the distance between the inner wall surface where the oxygen burner is fitted and the opposing inner wall surface, melting and preheating of the metallic raw material to be heated can be controlled most suitably, and thus various metallic raw materials can be melted efficiently. In the case where a plurality of oxygen burners are to be employed, it is possible to achieve reduction in the melting time and so on by suitably combining the directions in which flames are injected from the oxygen burners.

Meanwhile, by setting the position at which the oxygen burner is attached is at a height such that the portion of the melting section below the flame discharging hole of the oxygen burner may have a volume of 0.35 to 0.9 times the entire volume of the melting section, further improvement in the thermal efficiency can be achieved, exhibiting higher effect particularly in melting a metallic raw material having a high melting point such as iron.

Further, by using an eccentric burner as the oxygen burner and fitting it to the melting furnace to be able to turn on the burner axis, the direction in which flames are injected from the burner can be changed depending on the melting stage of the metallic raw material to heat the metallic raw material suitably, and the preheating state in the preheating section can be suitably changed, in addition, the falling speed of the metallic raw material falling from the preheating section into the melting section can be controlled.

Heat efficiency can be further enhanced by providing a secondary combustion oxygen nozzle at an upper position of the melting section to burn unburned components. Further, the molten metal can be heated uniformly by providing a molten metal agitating nozzle at the bottom of the melting section to promote agitation of the molted metal thereby.

Next, a first method of melting a metallic raw material with the flame of an oxygen burner will be described. This method employs a metal melting furnace consisting of a melting section provided with the oxygen burner, a preheating section for preheating the metallic raw material and a reduced section, having an inner diameter smaller than those of the melting section and of the preheating section, located between the melting section and the preheating section, and an eccentric burner is employed as the oxygen burner which is turned on the burner axis depending on the melting stage of the metallic raw material.

By employing the metal melting furnace having a reduced section with a suitable inner diameter between the melting section and the preheating section, as described above, the charging rate of the raw material preheated in the preheating section and falling into the melting section can be controlled, and thus the metallic raw material can be introduced to the melting section at an optimum falling speed (charging rate).

Since the use of the eccentric burner as the oxygen burner enables injection of flames toward the bottom of the furnace to allow efficient utilization of the flames of the oxygen burner and the combustion gas for melting and preheating the metallic raw material, heat efficiency can be improved. Further, the direction of injecting flames can be changed by turning the eccentric burner depending on the melting stage of the metallic raw material, so that the metal in the melting section can be heated uniformly and that melting and preheating of the metallic raw material can be controlled most suitably.

In a second method of melting a metallic raw material, a metal melting furnace consisting of a melting section provided with the oxygen burner, a preheating section for preheating the metallic raw material and a reduced section, having an inner diameter smaller than those of the melting section and of the preheating section, located between the melting section and the preheating section is employed; and a carbon material is added to a molten slag present on the bath surface during the operation of melting the metallic raw material to effect foaming of the molten slag.

The flame introduced from the oxygen burner into the molten slag impinges upon the surface of the molten metal bath to heat it directly and then heats the molten slag while it agitates the slag as it floats up through the molten slag. In this process, the apparent bulk of the molten slag is increased by adding the carbon material to the molten slag to effect foaming thereof, and thus the thermal energy of the flame can be transferred effectively to the slag, in turn, the molten metal can be heated efficiently by the slag, leading to reduction in the melting time, improvement in heat efficiency, productivity, etc. and great reduction in the operation cost.

When the molten slag is to be foamed by controlling the basicity $\gamma=(CaO)/(SiO_2)$ of the molten slag to be within the range as expressed by the following equation: $0.001T-0.6 \leq \gamma \leq 0.0025T-1$, wherein T represents a molten metal treating temperature (°C.), the foaming state can be stabilized by controlling the reaction gas generating state is formed and physical properties of the molten slag.

The melting section in the metal melting furnace according this invention should be excellent in durability at high temperatures, oxidation resistance and corrosion resistance, because the melting section is subjected to the highest heat among other sections of the furnace and because it is inevitably brought into contact with the high-temperature combustion gas, so that the melting section is formed employing a furnace material of magnesia-containing component. The furnace material typically includes magnesia, magnesia-carbon type material, magnesia-chromia type material, etc.

Meanwhile, the reduced section should be excellent in durability at high temperatures, mechanical strength and abrasion resistance, because it is brought into contact with high-temperature combustion gas and undergoes impact when the metallic raw material falls, and a magnesia-chromia type furnace material is employed.

Further, since the heat resistance of the preheating section may be lower than those of the melting section and of the reduced section, an alumina type furnace material is employed for the preheating section.

Incidentally, the oxygen burners employable according to this invention are those which form high-temperature flames by burning fossil fuels such as heavy oil, kerosene, pulverized coal, propane gas and natural gases employing oxygen or oxygen-rich air as a combustion assisting gas. As the oxygen burner, for example, those disclosed in Japanese Patent Publication Nos. 3122/1991 and 43096/1995 may be employed. However, this invention is not to be limited to these burners, but burners of various structures may be employed depending on the kind of fuel and the like. The oxygen burner enjoys merits in that it suffers small heat loss in the discharge gas compared with a burner employing air as the combustion assisting gas; that the quantity of heat retained in the furnace is great; etc.

Meanwhile, in the eccentric burner employed as the oxygen burner according to this invention, the flame injected from the combustion nozzle at the tip of the burner body has a tilt angle with respect to the burner axis. As the eccentric burner, for example, one as disclosed in Japanese Unexamined Utility Model Publication No. 103025/1984, in which the channel of the nozzle attached to the tip of the straight tubular burner main body is tilted by a predetermined angle with respect to the burner axis, may be employed. However, the present invention is not to be limited to such burner, but burners of various structures may be employed depending on the kind of fuel and the like.

Further, as the mechanism for turning the eccentric burner, while one having a structure as disclosed in Japanese Unexamined Utility Model Publication No. 103025/1984 can be employed, this invention is not to be limited to such mechanism, but mechanisms of various structures may be employed.

BEST MODE FOR CARRYING OUT THE INVENTION

Figure 1:
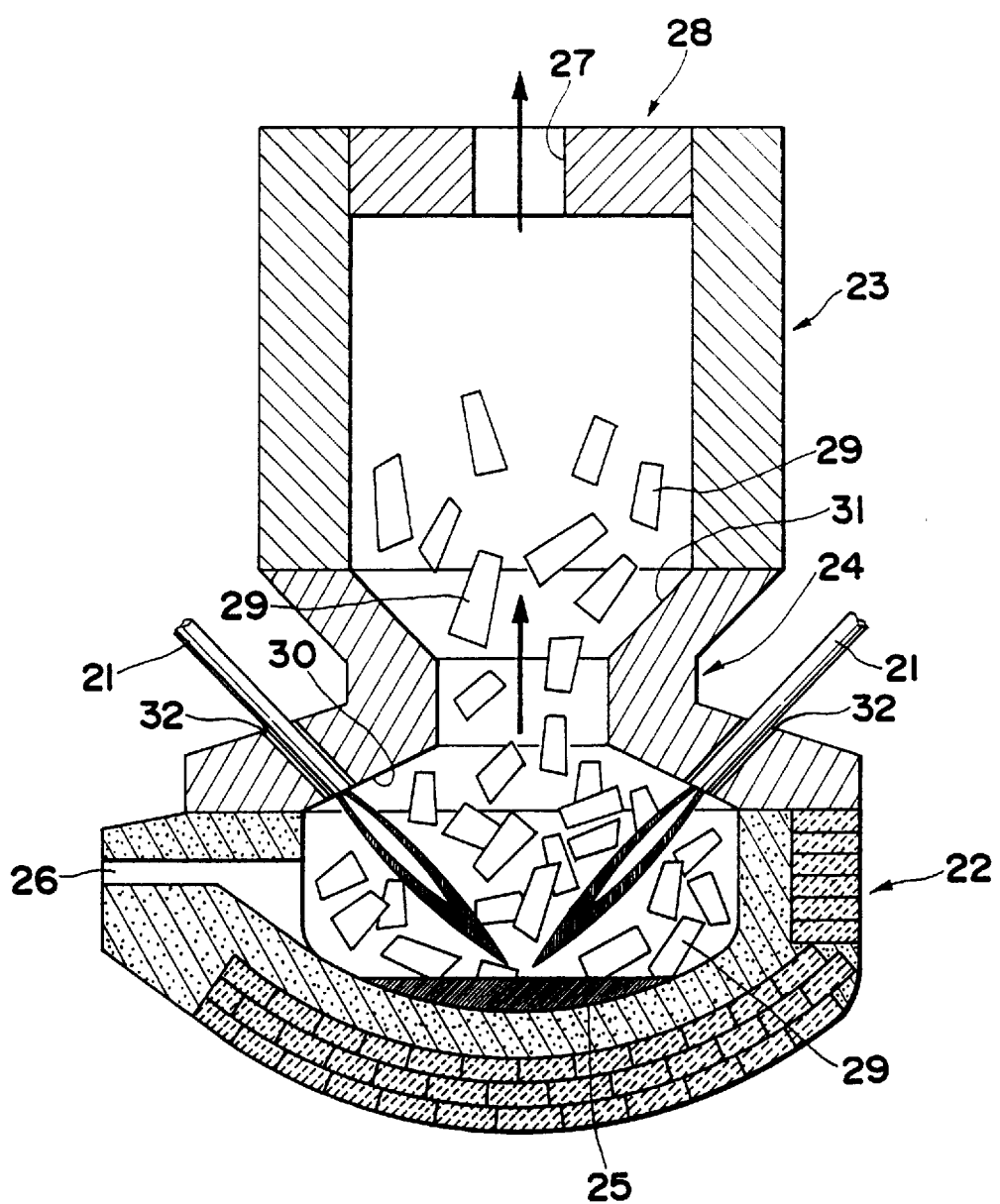
FIG. 1 is a vertical cross-sectional view of the metal melting furnace according to a first embodiment to which the present invention is applied.

This invention will be described in more detail referring to the drawings.

FIG. 1 is a vertical cross-sectional view of the metal melting furnace according to a first embodiment to which this invention is applied.

This melting furnace is adapted to achieve melting and regenerating, for example, scraps and ores of iron, copper, aluminum, etc. resorting to the heat of combustion generated by an oxygen burner 21 employing oxygen or oxygen rich air as a combustion assisting gas. The melting furnace has a melting section 22 at the bottom and a preheating section 23, at the top, formed integrally with the melting section 22, with a reduced section 24 being located between the melting section 22 and the preheating section 23.

The melting section 22 has an interior profile substantially the same as that of an ordinary metal melting furnace, e.g., an electric furnace, and is made of a magnesia-carbon type furnace material containing 5 to 20% by weight of carbon. Further, the melting section 22 has on one side a tapping port 26 for tapping a molten metal 25 formed by the melting treatment therethrough.

The preheating section 23 is formed into a substantially cylindrical shape and is made of an alumina-silica type furnace material. Further, a lid 28 having a vent 27 is removably applied to the upper opening of the preheating section 23.

The reduced section 24 is defined for controlling the falling speed of a metallic raw material 29 falling from the preheating section 23 to the melting section 22 and has an inner diameter smaller than those of the melting section 22 and preheating section 22. The reduced section 24 is made of a magnesia-chromia type furnace material containing 10 to 30% by weight of chromia. This reduced section 24 is preferably connected to the large-diameter melting section 22 and to the preheating section 23 by slant faces 30 and 31 having conical shapes, respectively, as shown in FIG. 1. Although it is possible to connect these sections with curved faces, in the case of a furnace with a lining of refractors material, such curved surfaces make the procedures of lining the refractory material intricate. If the angles of these slant faces 30, 31 are close to perpendicular, the furnace becomes high; whereas if they are close to horizontal, dead spaces are formed to be likely to lower heat efficiency, etc. Accordingly, the ceiling (slant face 30) of the melting section 22 and the bottom (slant face 31) of the preheating section 23 are preferably designed to have an angle of about 20 to 60 degrees and an angle of about 20 to 70 degrees with respect to the horizontal, respectively.

One or more oxygen burners 21 are to be inserted to insertion holes 32 defined through the barrel of the melting section 22 depending on the melting capacity to be required, and the burners 21 can be fitted in appropriate positions at the vertical portion of the furnace wall or the ceiling depending on the size of the melting section 22 etc. The oxygen burners 21 are fitted such that flames may be injected therefrom toward the bottom of the melting section 22, so that the metallic raw material 29 fallen into the melting section 22 may be melted from the lower portion in contact with the bottom of the melting section 22. A fuel such as a heavy oil or a pulverized carbon and a combustion assisting gas are introduced to the oxygen burners 21 through passages (not shown), respectively.

Figure 2:
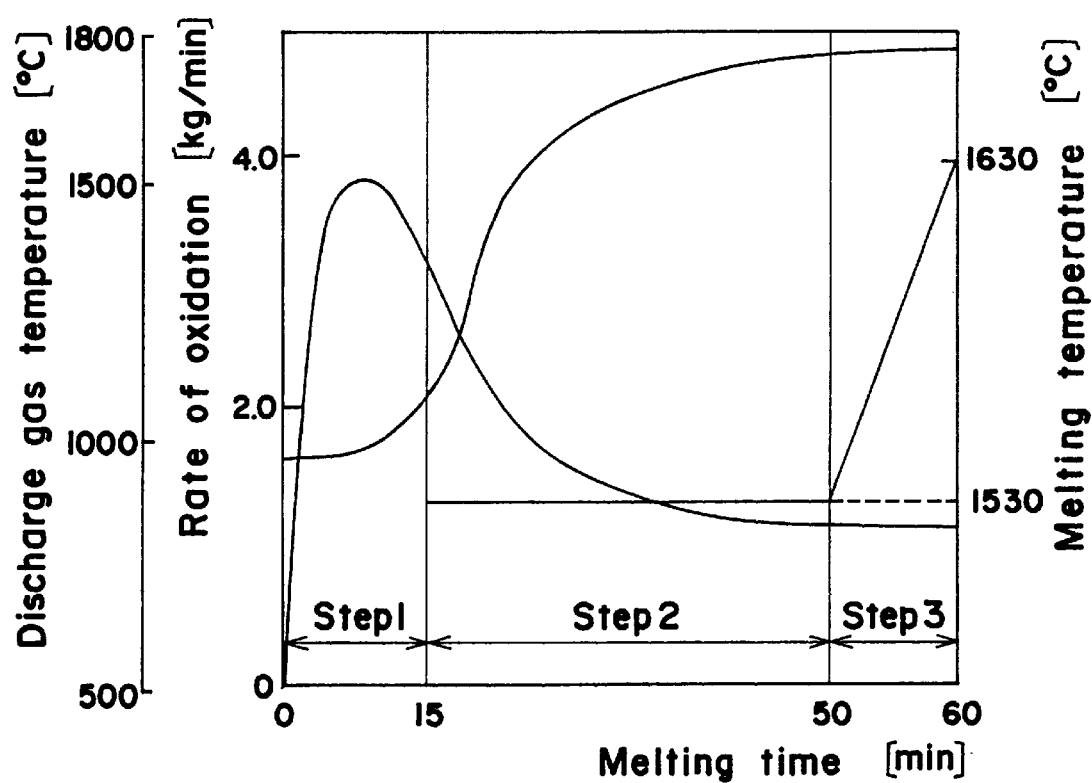
FIG. 2 is a chart showing a typical melting pattern when iron scraps are melted with oxygen burners only.

A typical melting pattern when iron straps are melted using oxygen burners only is shown in FIG. 2. In FIG. 2, the scraps charged into the furnace are preheated with a combustion gas obtained from the burners in Step 1, where the temperature of discharge gas is low, and the rate of oxidation is highest, because the surface area of the metal is great. In step 2, the substantial part of scraps is melted with a small amount of unmelted portion remaining at bottom of the furnace, and the calorific value of the combustion gas is consumed for melting the unmelted portion, the temperature of the molten metal being around the melting point. Since no scrap is present in the upper space of the furnace, the temperature of the discharge gas is elevated, and the surface area of the metal is reduced to lower the rate of oxidation. In Step 3, after the scraps are completely melted, the temperature of the molten metal is elevated by 100° C. from the melting point.

In the metal melting furnace in which the metallic raw material 29 is melted according to such melting pattern, the presence of the reduced section 24 having an appropriate size above the melting section 22 can suitably control the falling speed of the metallic raw material 29 which falls from the preheating section 23 to the melting section 22 to an optimum level without employing an iron grid. In addition, since the preheating section 23 can be provided immediately above the melting section 22, preheating of the metallic raw material 29 in Step 1 can be carried out efficiently.

More specifically, since the rate of the raw material falling from the preheating section 23 to the melting section 22 can be controlled to an optimum level by providing the preheating section 23 above the melting section 22 via the reduced section 24, there is no need of incorporating an apparatus for controlling the charge of raw material such as the iron grid as used in the prior art, and, for example, scraps and ores of iron, copper, aluminum, etc. can be melted efficiently in the melting furnace having such simple structure, thus achieving reduction in the production cost and maintenance cost, as well as, improvement of heat efficiency and reduction of melting time.

In the melting furnace having the structure as described above, while the reduced section 24 can be designed to have a suitable size depending on the treating capacity of the furnace, the capacity of oxygen burners, the kind of the metallic raw material, the sizes of the melting section 22 and the preheating section, etc., it is usually desirable to design the preheating section 23 to have a cross-sectional area of 1.4 to 5 times, preferably 1.5 to 4 times, as large as that of the reduced section 24. For example, if the cross-sectional area of the preheating section 23 is less than 1.4 times as large as that of the reduced section 24, the falling speed of the metallic raw material becomes too high, and the effect of the reduced section 24 can be hardly exhibited; whereas if that cross section is more than 5 times as large as the cross section of the reduced section 24, the reduced section 24 is too narrow and the metallic raw material cannot fall smoothly therethrough.

Meanwhile, referring to the relationship between the substantial volume of the preheating section 23 and that of the melting section 22, it is desirable to design the preheating section 23 to have a substantial volume of 0.4 to 3 times, preferably 0.5 to 2 times, as large as that of the melting section 22. For example, if the capacity of the preheating section 23 is too small compared with that of the melting section, the substantial part of the metallic raw material is not subjected to preheating but directly melted; whereas if the volume of the preheating section 23 is too large, most of the heat energy inputted is consumed for the preheating, lowering heat efficiency in both cases.

Incidentally, the substantial volume referred to above is appreciated to correspond to the bulk of scraps and the like present in the melting section 22 or the preheating section 23, when charged through the upper opening of the preheating section before the melting treatment is started, and is not equal to the volume calculated from the dimensions of the furnace.

Figure 3:
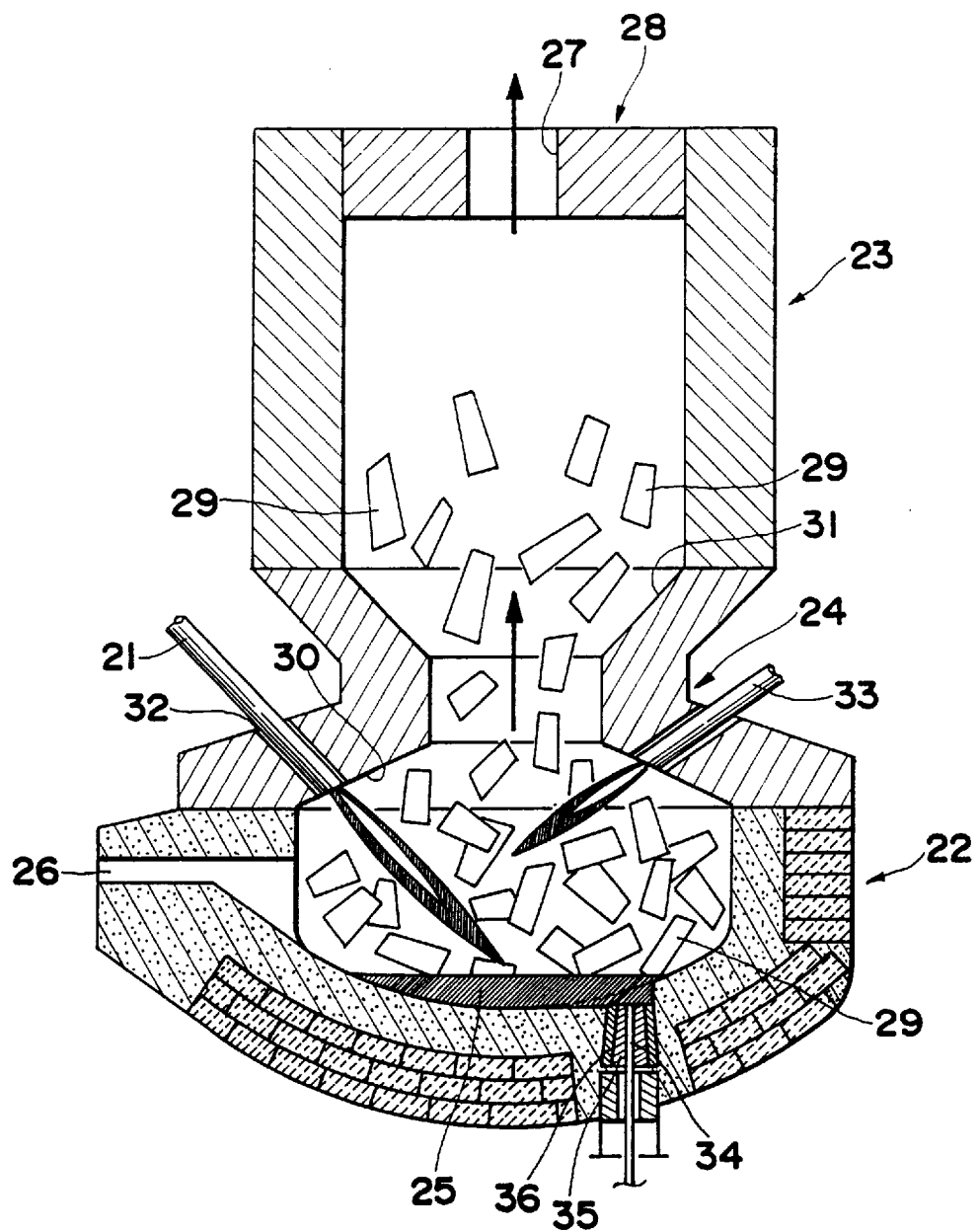
FIG. 3 is a vertical cross-sectional view of the metal melting furnace according to a second embodiment to which the present invention is applied.

FIG. 3 is a vertical cross-sectional view of the metal melting furnace according to a second embodiment to which the present invention is applied. It should be noted here that the same constituents as in the melting furnace according to the first embodiment are affixed with the same reference numbers respectively, and detailed description of them will be omitted.

The melting furnace according to the second embodiment is of the same constitution as that of the first embodiment, except that a secondary combustion oxygen nozzle 33 is provided at an upper position of the melting section 22 and that a molten metal agitating nozzle 34 is provided at the bottom of the melting section 22.

More specifically, the secondary combustion oxygen nozzle 33 can be provided at a suitable position on the vertical portion of the furnace wall or the ceiling depending on the size of the melting section and the like. This secondary combustion oxygen nozzle 33 is adapted to improve heat efficiency by blowing oxygen into the melting section 22 to burn combustible components generated from the metallic raw material, auxiliary raw materials, etc. during the melting treatment. The amount of oxygen to be blown through the secondary combustion oxygen nozzle can be controlled by detecting on line the discharge gas components.

The molten metal agitating nozzle 34 is provided at the bottom of the furnace wall of the melting section 22 via a plug 35 and a receiving sleeve 36. This molten metal agitating nozzle 34 blows a gas Into the molten metal to agitate it so that it may be heated uniformly. While a single tube type plug is employed in this embodiment, a capillary tube composite plug or a porous refractory plug may be employed.

Figure 4:
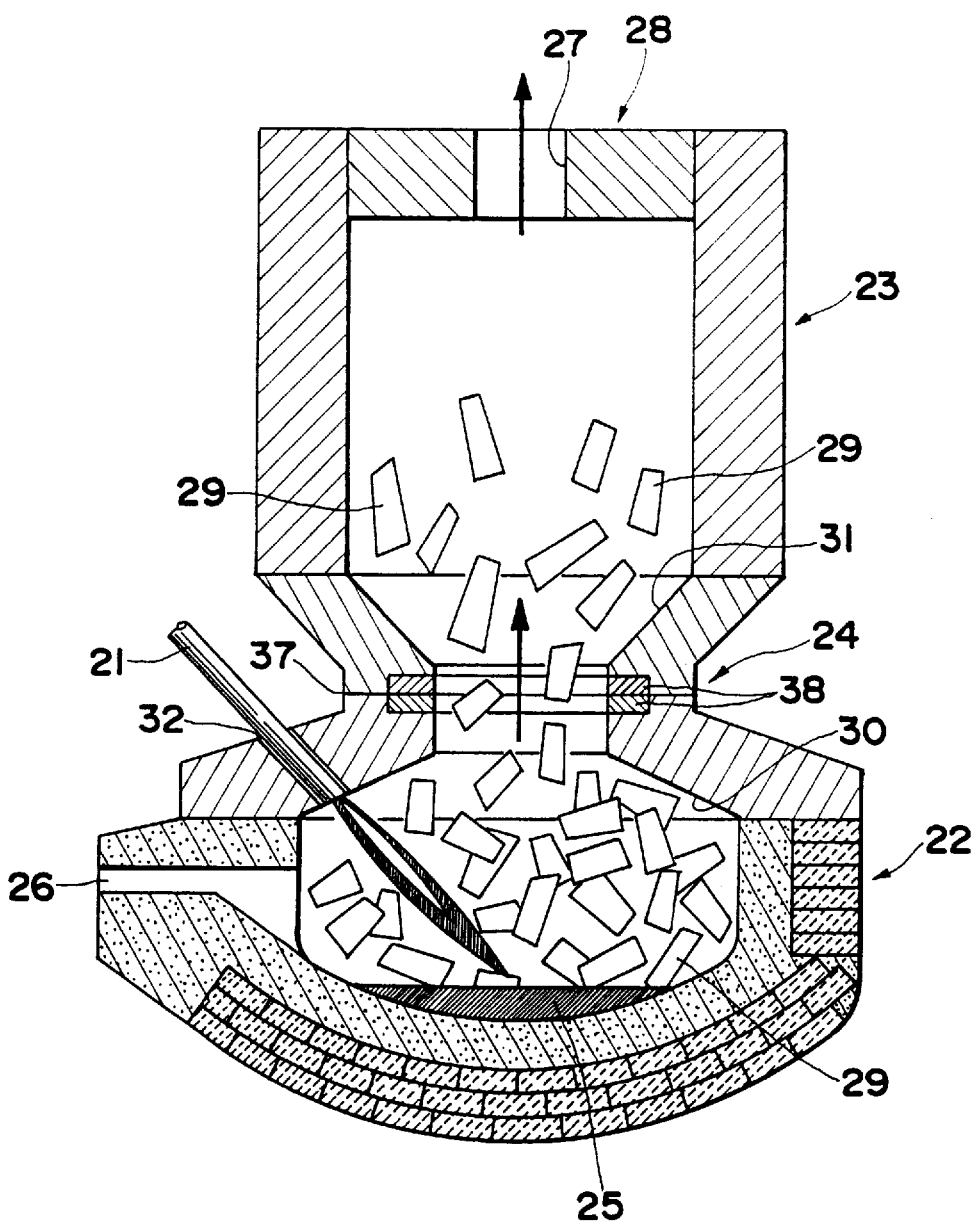
FIG. 4 is a vertical cross-sectional view of the metal melting furnace according to a third embodiment to which the present invention is applied.
Figure 5:
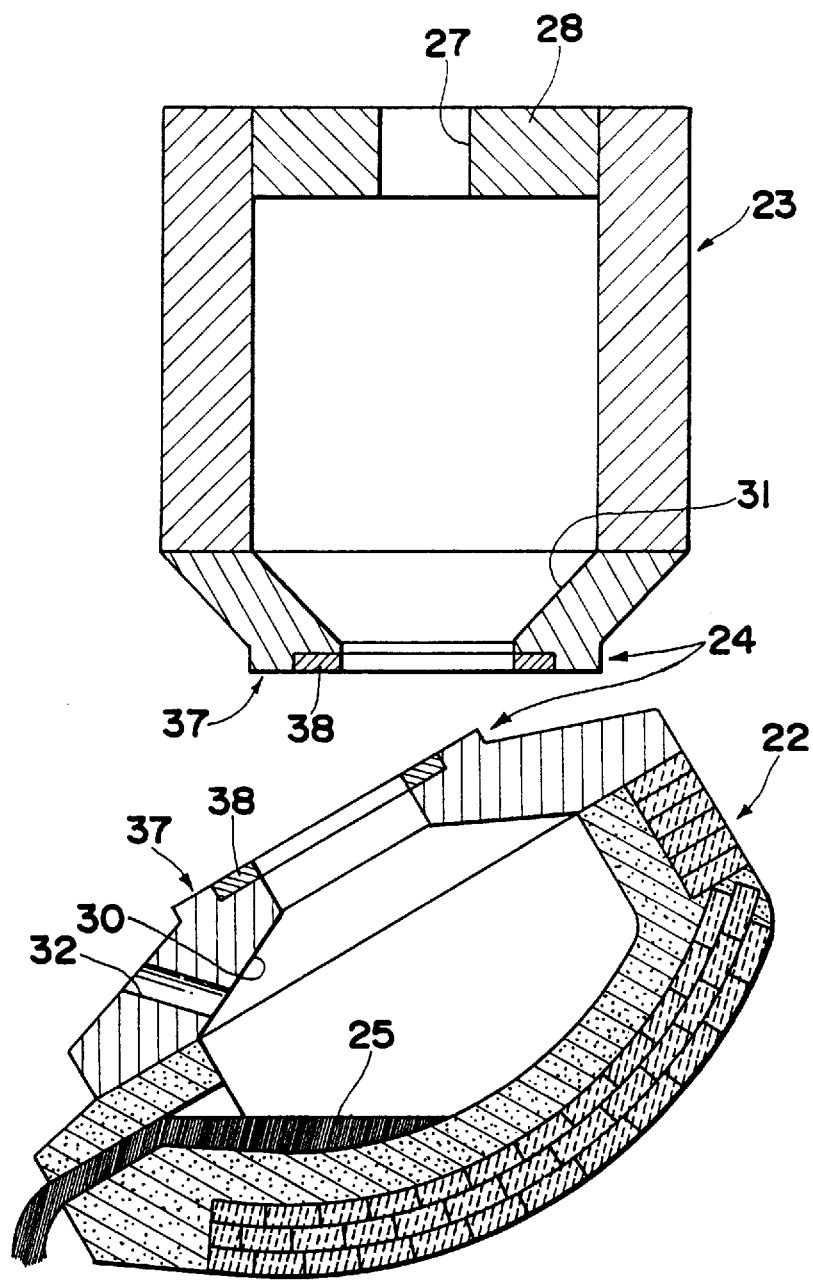
FIG. 5 is a vertical cross-sectional view of the metal melting furnace shown in FIG. 4 assuming a state where a molten metal is tapped.
Figure 6:
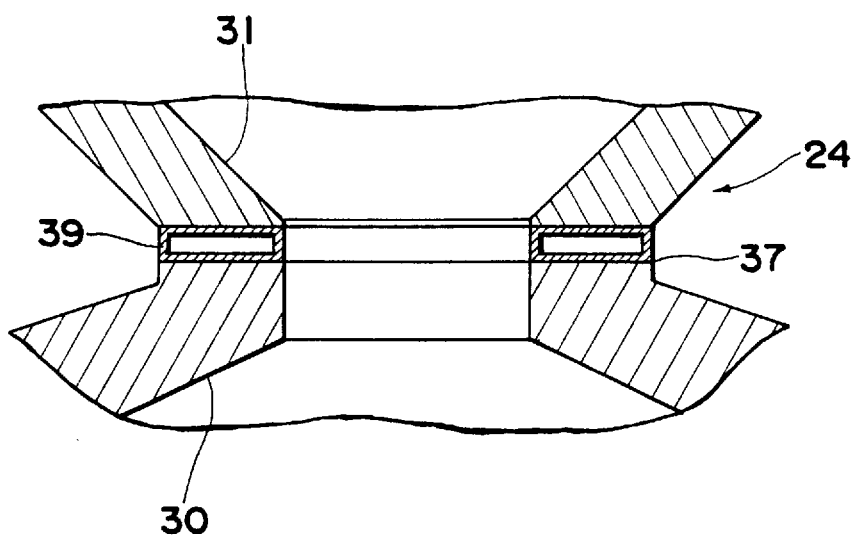
FIG. 6 is a vertical cross-sectional view of a variation of the splitting section of the metal melting furnace in FIG. 4, showing the major portion thereof.

FIGS. 4 to 6 are vertical cross-sectional views of the metal melting furnace according to a third embodiment to which the present invention is applied. Incidentally, constituents which are similar to those in the metal melting furnace according to the first embodiment are affixed with the same reference numbers respectively, and detailed description of them will be omitted.

The metal melting furnace of the third embodiment has the same constitution as in the metal melting furnace of the first embodiment, except that it has a splitting section 37, at the middle of the reduced section 24, for separating the melting section 22 and the preheating section 23 from each other.

According to this embodiment, the melting section 22 and the preheating section 23 are designed to be separable from each other by providing the splitting section 37. Thus, when the molten metal in the melting section 22 is to be tapped, the melting section 22 is separated from the preheating section 23, as shown in FIG. 5, to perform tapping by tilting the melting section 22 only. Accordingly, even in the case of the high metal melting furnace having the preheating section 23 via the reduced section 24 above the melting section 22, the entire furnace need not be tilted, or the molten metal need not be tapped from the bottom of the furnace, but the tapping operation can be performed in a very small space.

The quantity of heat to be dissipated from the melting section 22 when it is separated from the preheating section 23 can be minimized by providing the splitting section 37 at or adjacent to the reduced section 24 having a relatively small diameter, particularly at the reduced portion 24 having the smallest inner diameter.

To describe now a unit for tilting the melting section 22, usually, the heavy melting section 22 is preferably supported by the unit around the center of gravity thereof, so that the melting section 22 cannot be tilted simply. Thus, when the tapping operation is to be carried out, the preheating section 23 and the part of the reduced section 24 upper than the splitting section 37 are first lifted to be separated from the melting section 22, and then the tilting unit is actuated to tilt the melting section 22. Otherwise, the melting section 22 and the part of the reduced section 24 lower than the splitting section 37 may be descended before the melting section 22 is tilted. Further, if the center on which the melting section 22 is turned is set at a suitable position, tapping can be carried out by merely tilting the melting section 22. Otherwise, the melting section 22 or the preheating section 23 may be moved horizontally.

As described above, although the presence of the splitting section 37 can facilitate the tapping operation within a limited space, splash and slag of the molten metal, which occur during the melting treatment, are liable to be deposited around the reduced section 24 where the splitting section 37 is present, so that the refractory materials on the inner surface of the furnace can be damaged by such deposited matters which are pulled apart when the melting section 22 and the preheating section 23 are separated from each other.

Accordingly, the splitting section 37 preferably is of a structure which is hardly contaminated with splash and slag of the molten metal and which is hardly damaged. For such purpose, in the metal melting furnace shown in FIGS. 4 and 5 the splitting section 37 is formed using a carbon refractory 38 (e.g., MgO—C) which is hardly contaminated with splash and slag and which is hardly damaged. Meanwhile, in the metal melting furnace shown in FIG. 6, a water-cooling jacket 39 is provided at the splitting section 37. Damage of the refractory material at the splitting section 37 can be avoided by employing the carbon refractory 38 or the water-cooling jacket 39 as described above.

Figure 7:
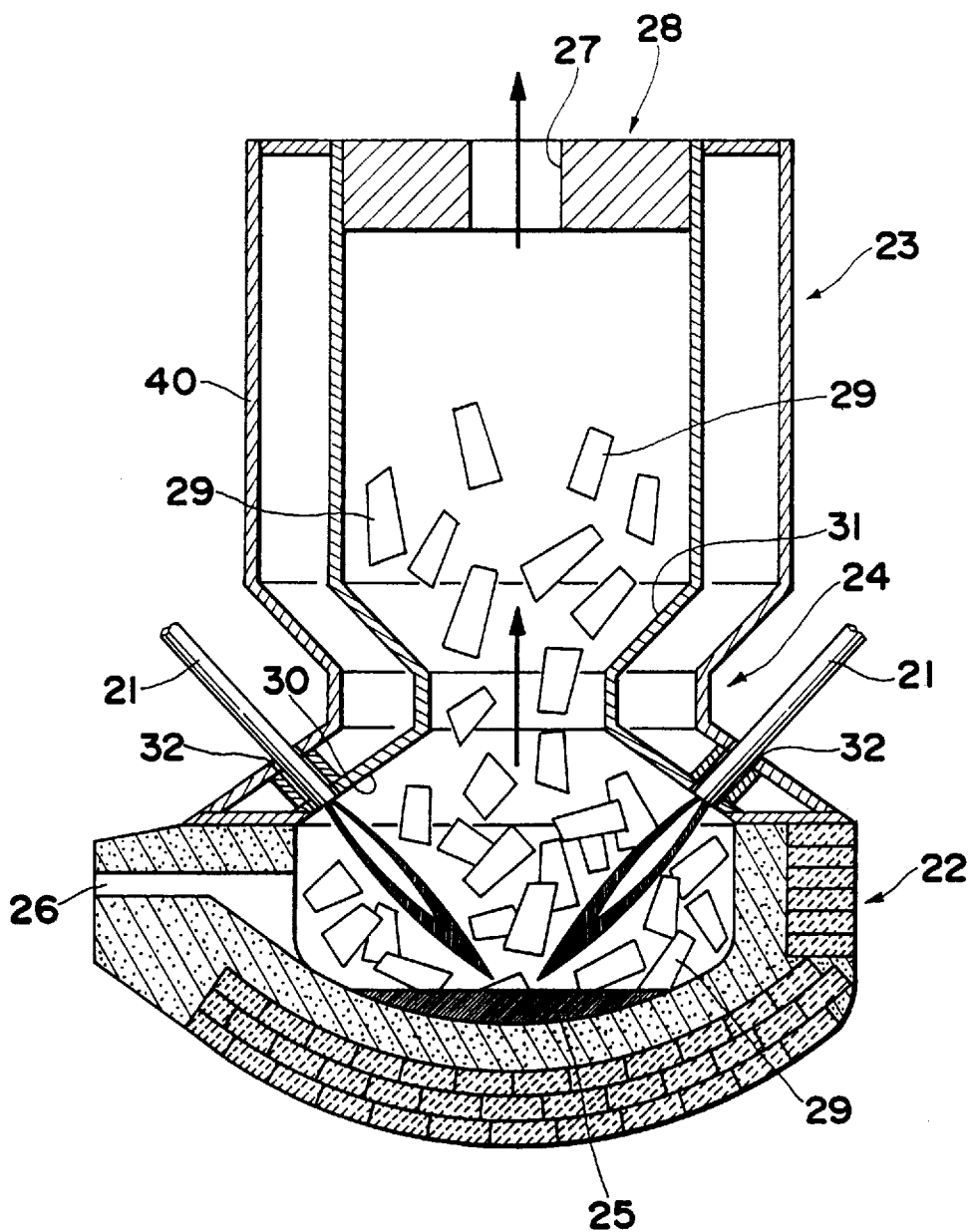
FIG. 7 is a vertical cross-sectional view of the metal melting furnace according to a fourth embodiment to which the present invention is applied.

FIG. 7 is a vertical cross-sectional view of the metal melting furnace according to a fourth embodiment to which the present invention is applied. Incidentally, constituents which are similar to those in the metal melting furnace according to the first embodiment are affixed with the same reference numbers respectively, and detailed description of them will be omitted.

The metal melting furnace of the fourth embodiment is of the same constitution as the metal melting furnace of the first embodiment, except that a water-cooling jacket 40 constitutes the upper portion of the furnace wall in the melting section 22 and that the angle of the inner wall surface (slant face 30) of the water-cooling jacket extended from the upper portion of the furnace wall toward the reduced section 24 is designed to be within a range of 20 to 60 degrees with respect to the horizontal, with the oxygen burners 21 penetrating the water-cooling jacket 40. Incidentally, it is possible to employ a water-cooling tube in place of the water-cooling jacket.

More specifically, the furnace walls of the reduced section 24 and of the preheating section 23 above the furnace wall of the melting section 22 are formed by the water-cooling jacket 40, and the furnace wall of the lower portion of the melting section 22 to be brought into contact with the molten metal is constructed with refractory materials. The ceiling (slant face 30) of the melting section 22 in this water-cooling jacket 40 is formed to have a conical shape converging at a climbing angle within the range of 20 to 60 degrees from the barrel of the melting section 22 toward the inner circumference of the reduced section 24; whereas the bottom (slant face 31) of the preheating section 23 is formed to have a conical shape converging downward toward the inner circumference of the reduced section 24.

The climbing angle of the lower surface of the ceiling significantly influences the melting performance, heat efficiency and heat loss in the melting section 22, and when the climbing angle is within the range of 20 to 60 degrees, the water cooling heat loss and the heat efficiency are balanced, enabling efficient melting operation.

More specifically, when the climbing angle is smaller than 20 degrees, transference of heat from the flames of the oxygen burners 21 and the surface of the molten metal to the water-cooling jacket 40 is increased to increase the water cooling heat loss; whereas when the climbing angle is greater than 60 degrees, transference of heat from the oxygen burners 21 to the metal is reduced, although the water cooling heat loss may be reduced, leading to reduction in the heat efficiency.

Accordingly, by setting the climbing angle of the ceiling within the range of 20 to 60 degrees, water cooling can be achieved with minimized reduction in the melting performance and heat efficiency, and the cost of refractory materials can be reduced on a great margin. Thus, the cost of melting the metal as a whole can be reduced, even if the reduction in the heat efficiency is taken into account. In addition, while it takes many days for repairing or replacing the damaged refractory materials, the water-cooling jacket 40 scarcely requires mending, improving rate of operating the furnace.

Figure 8:
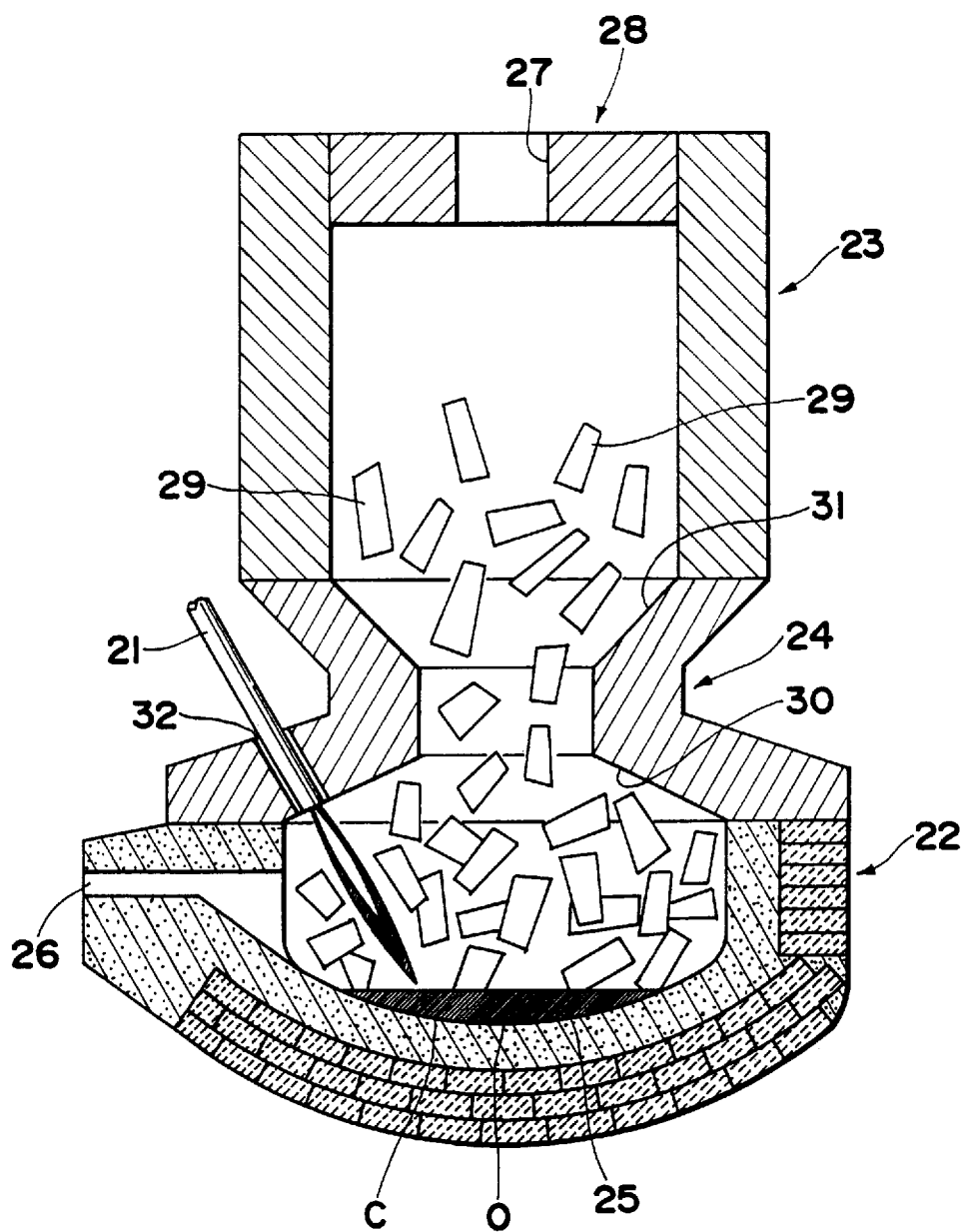
FIG. 8 is a vertical cross-sectional view of the metal melting furnace according to a fifth embodiment to which the present invention is applied.
Figure 9:
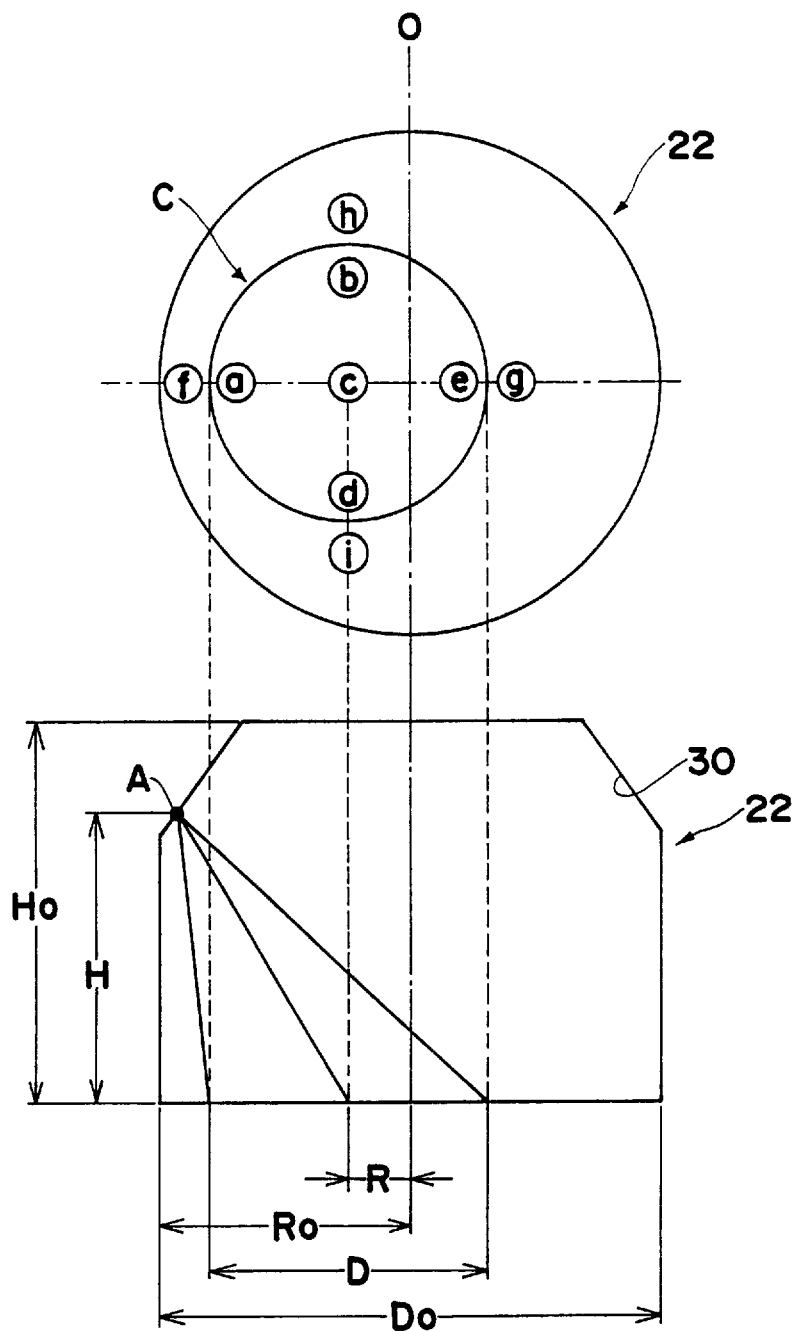
FIG. 9 is a chart for explaining the direction in which the flame of an oxygen burner is injected and the height at which the oxygen burner is attached in the metal melting furnace shown in FIG. 8.

FIGS. 8 and 9 are drawings of the metal melting furnace according to a fifth embodiment to which the present invention is applied. FIG. 8 Is a vertical cross-sectional view of the metal melting furnace. FIG. 9 is a chart for explaining the direction in which the flame of an oxygen burner is Injected and the height at which the oxygen burner is attached. Incidentally, constituents which are similar to those in the metal melting furnace according to the first embodiment are affixed with the same reference numbers respectively, and detailed description of them will be omitted.

The metal melting furnace according to the fifth embodiment is of the same constitution as the metal melting furnace of the first embodiment, except that the oxygen burner 21 is attached at an optimum position. More specifically, in this embodiment, the flame is injected from the oxygen burner 21 toward a circle drawn, on the bottom of the melting section, on a point located at a distance of 0.2 times the distance, between the center of gravity and the inner wall surface where the oxygen burner is fitted, closer from the center of gravity toward that inner wall surface, and the circle has a diameter of 0.6 times as large as the distance between that inner wall surface where the oxygen burner is fitted and the opposing inner wall surface. The position at which the oxygen burner 21 is fitted is designed to be of a height such that the volume of the melting section below the flame injecting hole of the oxygen burner 21 may be 0.35 to 0.9 times as large as the entire volume of the melting section 22.

Since the conditions under which flames formed by combustion at the oxygen burner 21 are allowed to impinge upon the material to be heated (metallic raw material and molten metal) significantly influence the efficiency of heat-melting it, it is important to carry out complete burning before the flames are allowed to impinge upon the material to be heated and to enhance kinetic energy of the flames. For example, the rate of combustion until the flames impinge upon the material to be heated is lowered if the flame injecting hole of the burner is at a very low position. However, if the flame injecting hole of the burner is at a very high position so as to increase the rate of combustion, the kinetic energy (impinging rate) of the flames impinging upon the material to be heated is lowered. Further, the angle at which the burner is attached (flame injecting angle) is also important as well as the amount of the combustion gas itself and relative position of the flames and the material to be heated so as to increase the kinetic energy, and if the tilt angle of the oxygen burner is too small, the kinetic energy cannot be increased to a sufficient level. Meanwhile, the greater the tilt angle is, the easier becomes transference of the kinetic energy of flames to the material to be heated, and an effect of accelerating melting by stirring action may be expected. However in the case of the furnace having the preheating section 23 above the melting section 22, the oxygen burner 21 must be attached so as to avoid melting of the burner by contact with the molten metal or interference of the burner with the furnace, so that the zone where the oxygen burner 21 can be attached in the space above the molten metal in the melting section is inevitably limited.

Thus, while the direction in which flames of the oxygen burner 21 are injected and the fitting position thereof are set depending on the shape and size of the melting section 22, provided that the distance between the center of gravity O of the melting section and the inner wall surface on the oxygen burner attaching side A is Ro, and the distance between the inner wall surface on the oxygen burner attaching side A and the opposing inner wall surface is Do, as shown in FIG. 9, the flames of the oxygen burner 21 are designed to be injected toward a circle C, having a diameter of 0.6 times as large as the distance Do, drawn on a point located at a distance R of 0.2 times the distance Ro closer from the center of gravity O toward the oxygen burner attaching side A. Thus, the conditions under which flames are allowed to impinge upon the metal can be optimized.

Meanwhile, the height at which the oxygen burner 21 is attached is designed to be such that the volume of the melting section below the flame injecting hole of the oxygen burner 21 may be 0.35 to 0.9 times, preferably 0.45 to 0.80 times as large as the entire volume of the melting section 22.

It should be noted here that in the case where the bottom of the melting section 22 has a substantially circular form having a diameter of Do and a radius of Ro, the central position of the circle C toward which flames are injected from the oxygen burner 21 is closer from the center of the melting section (equal to the center of gravity) by 0.2 Ro toward the burner fitting side, and the circle C has a diameter of 0.6 Do.

Meanwhile, for example, when the melting section 22 has a substantially cylindrical form, the height H of the flame injecting hole (nozzle tip) of the oxygen burner 21 is 0.35 Ho to 0.9 Ho, preferably 0.45 Ho to 0.80 Ho, provided that the height of the melting section is Ho. However, the height H actually varies a little depending on the shapes of the bottom and ceiling of the melting section 22.

Figure 10:
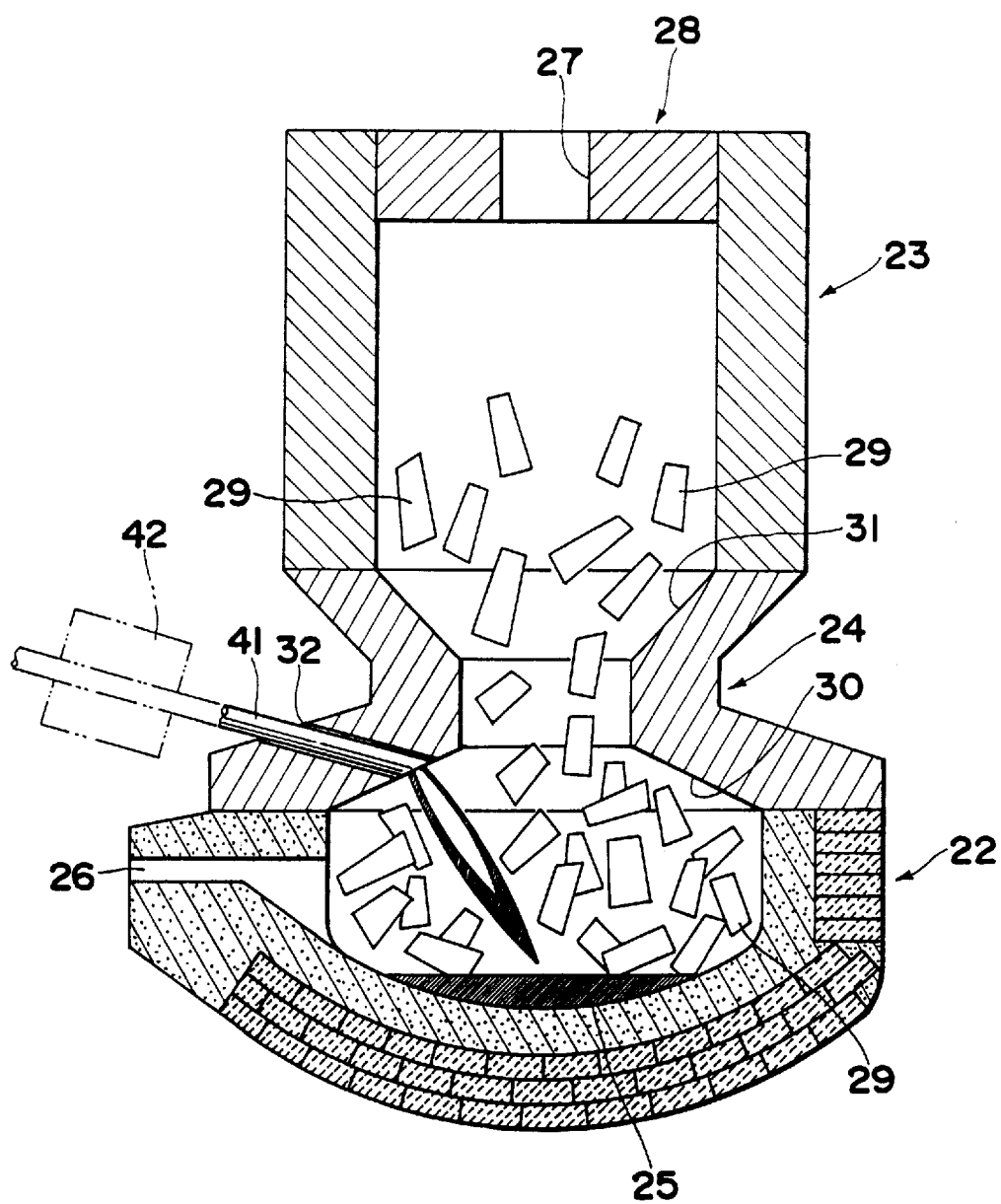
FIG. 10 is a vertical cross-sectional view of the metal melting furnace according to a sixth embodiment to which the present invention is applied.

FIG. 10 is a vertical cross-sectional view of the metal melting furnace according to a sixth embodiment to which the present invention is applied. Incidentally, constituents which are similar to those in the metal melting furnace according to the first embodiment are affixed with the same reference numbers respectively, and detailed description of them will be omitted.

The metal melting furnace of the sixth embodiment is of the same constitution as the metal melting furnace of the first embodiment, except that an eccentric burner 41 is employed as the oxygen burner and that the eccentric burner 41 is fitted so that it can be turned on the axis of the burner by a turning mechanism 42. Incidentally, as the eccentric burner 41 and the turning mechanism 42, for example, those disclosed in Japanese Unexamined Utility Model Publication No. 103025/1984, as described above, may be employed.

As described above, use of the eccentric burner 41 enables injection of flames at a great angle against the bottom of the melting section 22 even if there is limitations to the angle at which the oxygen burner is attached and the burner is attached at a small angle, thus achieving uniform heating without forming dead zone around the periphery in the melting section 22.

Meanwhile, referring to rapid melting of the metallic raw material, the conditions under which flames formed by combustion at the burner are allowed to impinge upon the material to be heated significantly influence the efficiency of heat-melting etc., and it is essential to effect sufficient combustion before the flames impinge upon the material to be heated and to increase the kinetic energy of the flames. The rate of combustion until the flames impinge upon the material to be heated is reduced if the distance is too small. However, if that distance is increased so as to enhance the rate of combustion, the impinging rate is reduced to lower the kinetic energy. Meanwhile, in order to enhance the kinetic energy, it is advantageous to secure a great impinge angle to be close to perpendicular as well as to increase the amount of the combustion gas itself, and thus the efficiency of transferring heat to the material to be heated can be increased.

Accordingly, by injecting flames in the perpendicular direction using the eccentric burner 41, softening and melting of the metallic raw material 29 charged from the melting section 22 throughout the preheating section 23 continuously in the form of column can be retarded at the base portion at the initial stage of melting, and falling of the metallic raw material 29 can be retarded to some degree, thus achieving sufficient preheating; whereas at the later stage of melting, the kinetic energy of flames impinging upon the material to be heated is readily transferred to the molten metal, and an improved effect of accelerating melting can be exhibited by the molten metal stirring action and the like.

Meanwhile, as in the first metal melting method according to this invention, the effect of heating the material to be heated uniformly can be improved or the falling speed at which the metallic raw material 29 falls from the preheating section 23 can be controlled by turning the eccentric burner 41 on the axis thereof depending on the stage of melting.

Figure 11:
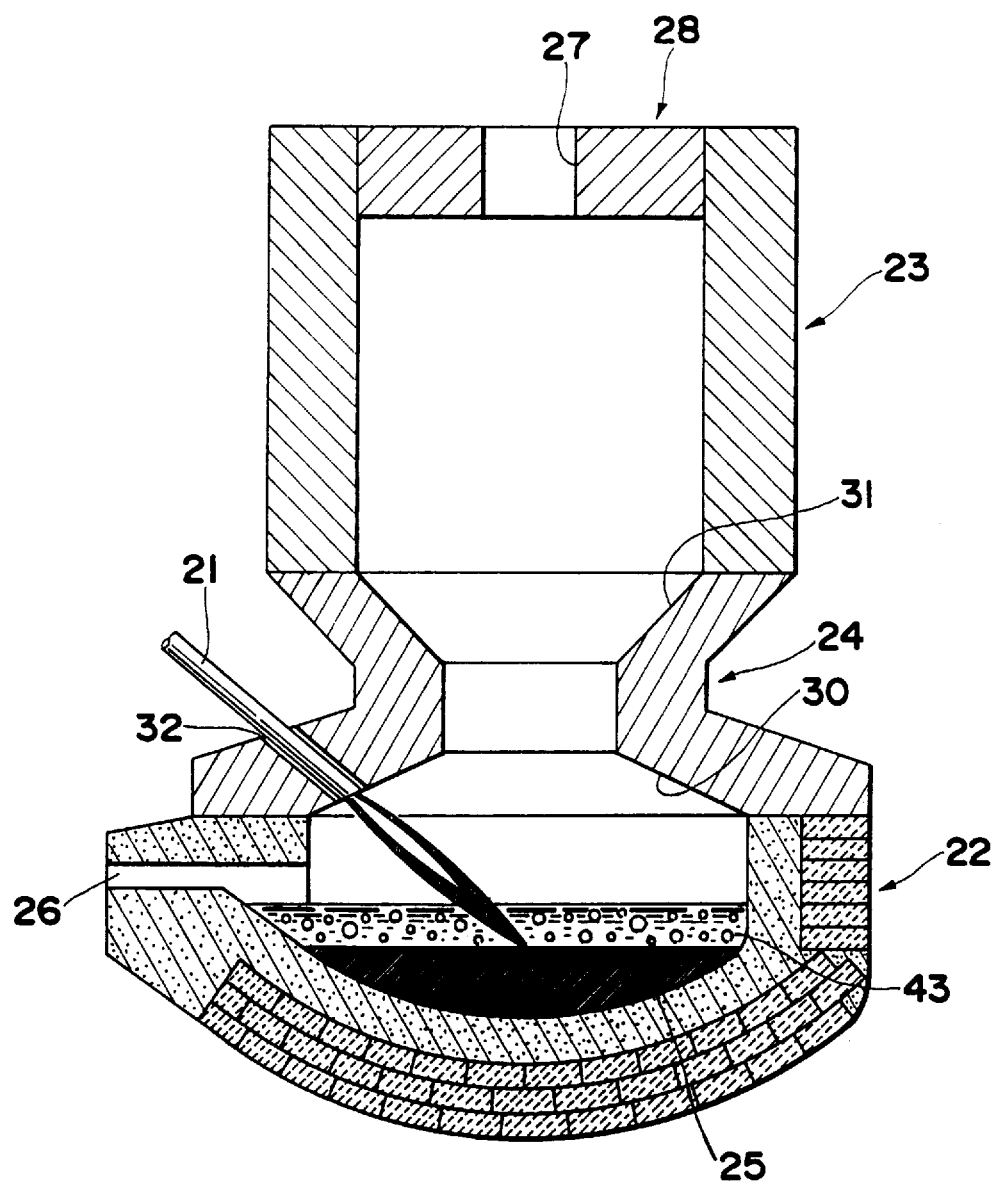
FIG. 11 shows, in vertical cross-sectional view, an embodiment of the metal melting furnace for explaining a second metal melting method according to this invention.

FIG. 11 shows, in vertical cross-sectional view, an embodiment of the metal melting furnace for explaining a second metal melting method according to this invention. Incidentally, constituents which are similar to those in the metal melting furnace according to the first embodiment are affixed with the same reference numbers respectively, and detailed description of them will be omitted.

In the second metal melting method according to this invention, which employs the metal melting furnace as shown in FIG. 11, a carbon material is injected to the molten slag present on the surface of the bath during the process of melting the metallic raw material to foam the molten slag and provide a foaming slag 43, and thus heating efficiency is improved. If the basicity γ of the molten slag is controlled to be within the range expressed by the equation $0.001T-0.6 \leq \gamma \leq 0.0025T-1$, wherein T represents a molten metal treating temperature (°C.), a stable forming state can be obtained.

More specifically, when the metallic raw material is to be melted with the flames injected from the oxygen burner 21 in the metal melting furnace shown in FIG. 11, a carbon material is injected to the molten slag present on the bath surface in the melting section 22 at the middle or later stage of melting to provide a foaming slag 43.

Thus, foaming of the molten slag is discussed as a method of accelerating heat transfer utilizing the foaming slag state in the secondary heating technique, etc. In the iron ore melt-reduction method. In this heat transfer accelerating method, the carbon monoxide gas formed by a primary reaction between the iron ingot and carbon is reacted with an oxygen gas add into the slag or above it to effect secondary combustion to form carbon dioxide. If the secondary combustion is achieved in the slag, the carbon dioxide gas heated to a high temperature by the forming reaction performs heat exchange with the slag while it floats up through the foaming slag to heat the slag.

The heat transfer efficiency in this foaming state is further increased in the present invention, and the high-temperature flames from the oxygen burner 21 performs heat transfer over the entire dwelling time since they have intruded into the foaming slag 43 as close as to the bath until the flames get out of the slag. Thus, the quantity of heat to be transferred to the slag can be further increased compared with the above-described method resorting to the secondary combustion.

Usually, when the metallic raw material is to be melted by the flames of an oxygen burner, the flames of the oxygen burner impinge upon the bath surface of the molten metal to heat the metal directly and then exchange heat with the slag present in the form of liquid on the bath surface to heat and circulate the slag as they float up therethrough, and thus the metal is heated indirectly by the slag.

This indirect heating is greatly influenced by the state that the combustion gas passes through the slag layer, and the higher the slag height, the more advantageous. However, increase of slag, which brings about thermal problems and which is operationally disadvantageous in view of fusing of refractory materials should be avoided. Therefore, a carbon material is charged into the molten slag to allow the reducible components such as iron oxides in the slag to react with the carbon material continuously to generate a gas which is utilized for foaming the slag. Since the apparent bulk of the slag is thus increased, the efficiency of heat exchange between the combustion gas and the foaming slag 43 can be increased, and indirect heating of the metal via the foaming slag 43 can be performed efficiently.

More specifically, while the flames injected from the oxygen burner 21 intrude into the foaming slag 43 to impinge upon the bath to heat it directly and then float up physically through the foaming slag 43 to heat it, since the apparent bulk of the slag is increased by foaming, the dwelling time of the combustion gas floating up the slag is extended to increase the quantity of heat to be transferred to the slag and to carry out effectively stirring and circulatory flowing of the slag by the combustion gas. Accordingly, transference of heat from the slag to the bath is also carried out efficiently, leading to reduction in the melting time and increase in the heat efficiency on a great margin. Furthermore, since iron oxides are reduced by the carbon material, yield of iron can be also improved.

As the carbon material, a pulverized or granular coke and the like may be employed. While the amount of the carbon material to be added depends on the amount of slag to be formed, the thickness of the slag layer, etc., it is usually added suitably in an amount of 1 to 10 kg/ton of the metallic raw material. If the amount of the carbon material to be added is small, sufficient foaming state may not be obtained; whereas if it is too great, the cost of the carbon material is elevated.

In order to achieve a stable foaming state, it is important to suitably control the reaction gas generating state and physical properties of the slag, i.e. the gas generating rate, the gas cell diameter, viscosity and surface tension of the slag. For example, when reducible oxides contained in the molten slag are to be reduced to generate foams of carbon monoxide, it is effective to employ a very fine carbon material so as to obtain fine foams. In order to obtain foams continuously, it is effective to add the carbon material continuously by suitable amounts.

Further, when the metallic raw material is to be melted, heating of it starting from the solid state via the solid-liquid mixed state to the liquid state should be carried out efficiently. While the bath temperature when the molten metal 25 is heated via the foaming slag 43 may fluctuate, for example in the case of iron, depending on the carbon concentration and the like, it is within the temperature range of between about 100° C. at which the iron raw material partly starts melting to be flattened and 1,300° to 1,600° C. or higher at which the molten metal can be tapped. As a result of extensive discussions for maintaining the slag in a stable foaming state within this temperature range, it was found that it is effective to control the basicity of the slag depending on the temperature thereof. More specifically, a stable foaming state can be achieved by controlling the molten slag basicity $\gamma=(CaO)/(SiO_2)$ to be within the range expressed by the following equation: $001T-0.6 \leq \gamma \leq 0.0025T-1$, wherein T represents a molten metal treating temperature (°C.), and the thermal energy of the flames of the oxygen burner 21 can be transmitted efficiently to the molten metal.

It should be noted that the present invention is not to be limited to the foregoing embodiments, but, for example, combinations of these embodiments are of course possible.

Examples of this invention will be described below.

EXAMPLE 1

Employing the metal melting furnace of the structure shown in FIG. 1, 1 ton of iron scraps were melted to carry out tests for confirming the effect of the reduced section. The melting section, the reduced section and the preheating section are made of magnesia-carbon (10%), magnesia-chromia (20%) and alumina-silica (12%), respectively. The melting section has a total height of 80 cm and an inner diameter of 90 cm uniformly. When 1 ton of iron is melted in this melting section, the height of the bath surface will be about 22 cm. Meanwhile, since the size of the melting section is uniform, ratio of the bulk of the scraps charged in the preheating section to that in the melting section, i.e. the substantial volume of the preheating section to that of the melting section will be substantially constant, about 1:1 in this case. Accordingly, when the iron scraps are charged through the upper opening of the preheating section into the furnace, the iron scraps are present in the preheating section and the melting section each in an amount of about 500 kg.

Three oxygen burners were attached to the slant ceiling of the melting section at an angle of about 60 degrees with respect to the horizontal plane toward the center of the furnace bottom. To each oxygen burner were supplied 35 kg/h of a pulverized coal as a fuel and a high-temperature oxygen of about 600° C. as the combustion assisting gas at an oxygen ratio of 1.0. The pulverized coal was pneumatically fed. The flame of this oxygen burner had a temperature of about 2,800° C. at the highest temperature portion and a flame length of 70 cm.

Melting treatment of 1 ton of iron scraps (heavy scraps) was carried out by changing the ratio of the diameter (cross section) of the reduced section to the diameter (cross section) of the preheating section to measure the scrap falling speed, time required for the melting and heat efficiency at a constant tapping temperature of 1630° C. The vertical length of the inner circumference at the reduced section was about 20 cm. The ceiling of the melting section connected to the reduced section had a gradient of about 30 degrees, and the bottom of the preheating section connected to the reduced section had a degree of gradient such that the scraps may not stay on it. Measurement results are shown in Table 1 and FIG. 12. It should be noted that the test No. 8 in Table 1 is of a comparative example where a metal melting furnace having no reduced section was employed.

TABLE 1

| Test No. | 1 | 2 | 3 | 4 | 5 | 6 | 7 | 8 |
|---|---|---|---|---|---|---|---|---|
| Cross-sectional area ratio (times) | 6 | 5 | 4 | 2 | 1.5 | 1.4 | 1.2 | 1.0 |
| Falling control factor | 70 | 93 | 95 | 97 | 100 | 105 | 140 | 200 |
| Melting time (min) | 60 | 51 | 48 | 47 | 45 | 51 | 62 | 99 |
| Heat efficiency (%) | 40 | 47 | 50 | 51 | 53 | 47 | 37 | 23 |

Figure 12:
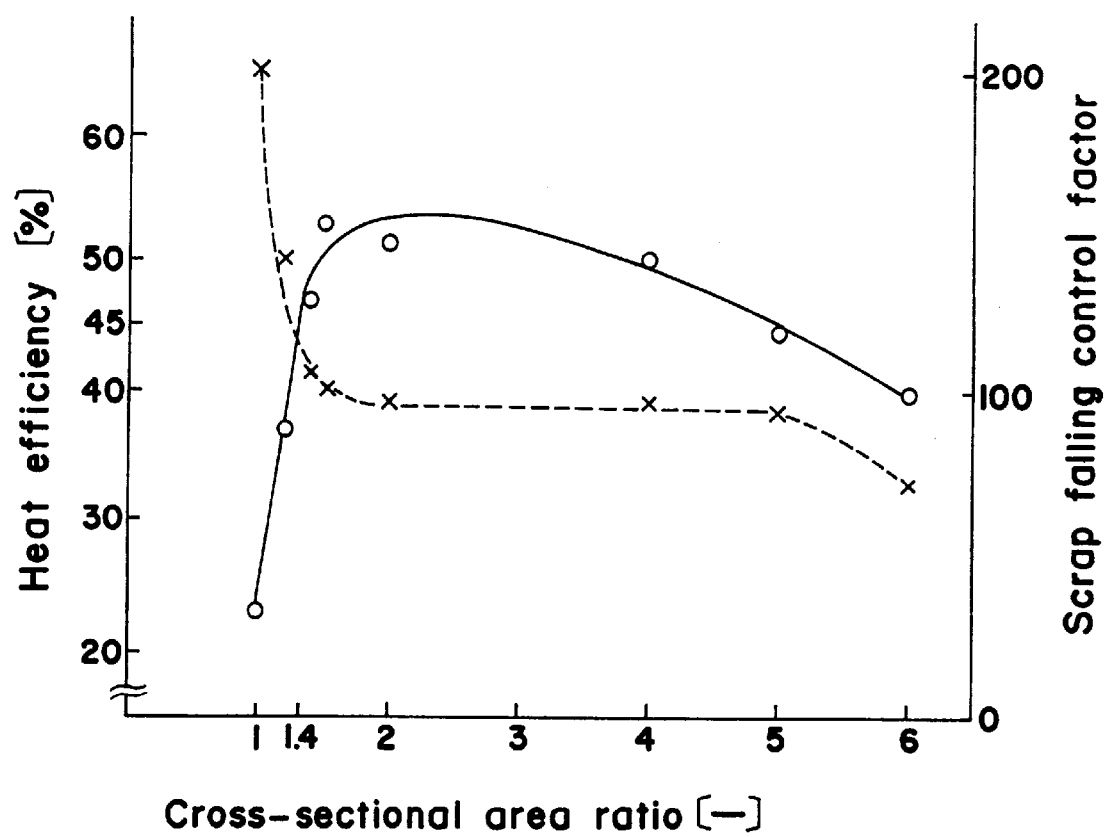
FIG. 12 is a graph showing measurement results of Example 1.

Heat efficiency in Table 1 was calculated according to the following equation:

$$\eta = HY/Q$$

wherein η: heat efficiency
H: heat capacity per 1 ton of molten metal
Y: melting yield
Q: combustion heat quantity at burners required for melting 1 ton of metallic raw material Meanwhile, the falling control factor was calculated according to the following equation:

$$\upsilon = 100T/t$$

wherein υ: falling control factor
t: time until the metallic raw material charged into the metal melting furnace entirely falls into the melting section since burning was started
T: t when the cross-sectional area of the preheating section is 1.5 times as large as that of the reduced section As clearly shown in Table 1 and FIG. 12, in the case where the ratio of the substantial volume of the preheating section to that of the melting section is fixed to about 1:1, it can be seen that the melting performance varies depending on the ratio of the cross-sectional area of the preheating section to that of the reduced section. Thus, it can be understood that the scrap falling control factor or the scrap falling speed influences significantly the melting performance: when the cross-sectional area of the preheating section is 6 times as large as that of the reduced section, the scrap falling speed becomes low, and the cross-sectional area of the reduced section is likely to be too small; whereas when the cross-sectional area of the preheating section is 1.2 times as large as that of the reduced section, the falling speed becomes too high to carry out sufficient melting, and the cross-sectional area of the reduced section is too large. As a result, it can be understood that reduction in the melting time and improvement in the heat efficiency can be achieved when the cross-sectional area of the preheating section is 1.4 to 5 times, particularly 1.5 to 4 times, as large as that of the reduced section.

EXAMPLE 2

Next, tests were carried out in the same manner as described above, except that the cross-sectional area of the preheating section was fixed to 1.5 times as large as that of the reduced section and that the ratio of the substantial volume of the melting section to that of the preheating section, i.e. the rate of the amount of iron scraps in the respective sections, was changed. The results are as shown in Table 2. Incidentally, the reduced section is regarded as a part of the preheating section in the calculations.

TABLE 2

| Test No. | 1 | 2 | 3 | 4 | 5 | 6 | 7 |
|---|---|---|---|---|---|---|---|
| Amount of scraps | | | | | | | |
| Preheating section (kg) | 230 | 286 | 333 | 500 | 667 | 750 | 800 |
| Melting section (kg) | 770 | 714 | 667 | 500 | 333 | 250 | 200 |
| Volume ratio (times) | 0.3 | 0.4 | 0.5 | 1 | 2 | 3 | 4 |
| Melting time (min) | 65 | 53 | 46 | 45 | 47 | 55 | 63 |
| Heat efficiency (%) | 37 | 47 | 52 | 53 | 51 | 42 | 38 |

EXAMPLE 3

Tests were carried out to melt 1 ton of iron scraps using a metal melting furnace having the structure shown in FIG. 3 and blowing secondary combustion oxygen through a secondary combustion oxygen nozzle into the furnace so as to confirm the effect of the secondary combustion oxygen. Incidentally, the tests were carried out in the same manner as in Example 1 except that the cross-sectional area of the preheating section was 1.4 times as large as that of the reduced section.

When oxygen was blown through the secondary combustion oxygen nozzle at a rate of 5 $Nm^3/h$, the heat efficiency was increased from 47% to 52%. On the other hand, the ratio of heat loss by exhaust combustion gas was reduced from 53% to 33%, and the quantity of heat dwelling in the furnace was increased from 47% to 67%.

EXAMPLE 4

Heat efficiency, when 1 ton of iron scraps were melted using the metal melting furnace of the structure shown in FIG. 7 and the water-cooling jacket was operated, was measured. The measurement was carried out in the same manner as in Example 2 except that the angle at which the oxygen burners were attached was 40 degrees.

The climbing angle (tilt angle) of the ceiling in the melting section was varied to measure factor of water-cooling heat loss, melting time and heat efficiency in the respective cases. Further, measurement was carried out likewise employing a metal melting furnace in which the entire melting section is made of a refractory material. The results are as shown in Table 3. Incidentally, the factor of water-cooling heat loss is the relative value provided that it is 100 when the climbing angle is 30 degrees.

TABLE 3

| | Refractory material | | Water-cooling jacket | | | | | | |
|---|---|---|---|---|---|---|---|---|---|
| Climbing angle (degree) | 25 | 30 | 15 | 20 | 25 | 30 | 40 | 50 | 60 | 70 |
| Water-cooling heat loss factor | 0 | 0 | 160 | 130 | 107 | 100 | 95 | 90 | 86 | 75 |
| Melting time (min) | 48 | 47 | 70 | 56 | 53 | 52 | 53 | 55 | 57 | 70 |
| Heat efficiency (%) | 50 | 51 | 34 | 43 | 45 | 46 | 45 | 43 | 42 | 34 |

As the results in Table 3 show, in the cases where the melting section is entirely made of a refractory material and the climbing angle is 25 or 30 degrees, i.e. when there is no water-cooling heat loss in this section, the rate that the input calorific value is effectively transferred to the molten metal, or the heat efficiency, was 50 to 51%. Meanwhile, in the case where the melting section was water-cooled with the water-cooling jacket, the water-cooling heat loss, melting time and heat efficiency changed depending on the climbing angle. For example, there was observed a reasonable tendency that the water-cooling heat loss increases, since the ceiling receives much heat from the molten metal if the climbing angle is small. However, there is no correlation between the level of water-cooling heat loss and the melting capacity, but a great difference was observed in the melting capacity between the climbing angles of 15 degrees and 25 degrees and between the climbing angles of 60 degrees and 70 degrees.

It can be judged from these data that the influence of water-cooling heat loss is increased at the climbing angle of between 15 degrees and 20 degrees and that the influence of the behavior of the combustion discharge gas in the melting section is increased at the angle of between 60 degrees and 70 degrees. Accordingly, when the melting section is to be water-cooled using the water-cooling jacket, it is inferred that the climbing angle of the ceiling is suitably set within the range of 20 to 60 degrees. Further, the heat efficiency in this case is 43 to 46%, which is considered to be a relatively good performance, although it is 4 to 8% lower than in the case where the melting section is made of a refractory material. In other words, although the heat efficiency is lowered, the metal melting cost as a whole can be reduced in view of damage of the refractory material.

EXAMPLE 5

Heat efficiency values when 1 ton of iron scraps (heavy scraps), 1 ton of copper (ore) and 400 kg of aluminum scraps (sash scraps) were melted using the metal melting furnace of the structure shown in FIG. 8 equipped with three oxygen burners to which a heavy oil and pure oxygen are supplied as a fuel and a combustion assisting gas respectively, were measured by changing the positions at which the oxygen burners are attached and the direction in which flames are injected. The melting section had a total height of 70 cm and an inner diameter of 90 cm, and the ceiling had a climbing angle of 30 degrees. The measurement was carried out in the same manner as in Example 2 except that the heavy oil was supplied at a flow rate of 90 lit/hour in total to three oxygen burners.

Heat efficiency values when flames of the oxygen burners were injected toward a, b, c, d, e, f, g, h and i in FIG. 9 are shown in Table 4, in which a to e are examples of the present invention, and f to i are comparative examples, provided that the expression "-" in Table 4 means that measurement was not carried out.

TABLE 4

| Direction of flames | Iron | Copper | Aluminum |
|---|---|---|---|
| a | 49 | 59 | 57 |
| b | 45 | — | 59 |
| c | 47 | 58 | 56 |
| d | 44 | — | — |
| e | 43 | 54 | — |
| f | 39 | 45 | 45 |
| g | 38 | 43 | — |
| h | 41 | 42 | 41 |
| i | 40 | — | 41 |

EXAMPLE 6

Heat efficiency values, when 5 tons of iron scraps (heavy scraps) were melted by installing six oxygen burners as used in Example 5 to the melting section having a total height of 120 cm and an inner diameter of 160 cm, and also having a ceiling with a tilt angle of 30 degrees, were measured in the same manner as in Example 5. The results are as shown in Table 5. Incidentally, the heavy oil was supplied at a flow rate of 400 lit/hour in total to the six oxygen burners.

TABLE 5

| Direction of flames | a | c | e | f | g | h | i |
|---|---|---|---|---|---|---|---|
| Heat efficiency | 54 | 55 | 51 | 41 | 39 | 41 | 42 |

EXAMPLE 7

Heat efficiency values when iron scraps (heavy scraps) were melted were measured in the same manner as in Examples 5 and 6 respectively except that the oxygen burners were changed to those employing pulverized coal as a fuel and that the pulverized coal was supplied to the burners at a rate of 90 kg/hour in the 1-ton furnace and at a rate of 400 kg/hour in the 5-ton furnace, respectively. The results are as shown in Table 6.

TABLE 6

| Direction of flames | a | b | c | d | e | f | q | h | i |
|---|---|---|---|---|---|---|---|---|---|
| 1 ton | 47 | 46 | 45 | 46 | 45 | 37 | 37 | 39 | 36 |
| 5 ton | 56 | — | 57 | 55 | 54 | 42 | 43 | 41 | 44 |

EXAMPLE 8

Heat efficiency values when iron scraps (heavy scraps) were melted were measured in the same manner as in Example 5 and 6 respectively except that the height at which the oxygen burners are attached was changed. The results are as shown in Table 7. The ratio in Table 7 is the percentage of the volume of the portion of the melting section present below the flame injecting holes of the oxygen burners, provided that the entire volume of the melting section is 1.

TABLE 7

| | 1 ton | | | 5 ton | |
| --- | --- | --- | --- | --- | --- |
| Direction of flames | Ratio | Heat efficiency | Direction of flames | Ratio | Heat efficiency |
| a | 0.32 | 45 | a | 0.35 | 59 |
| a | 0.35 | 50 | a | 0.90 | 58 |
| a | 0.45 | 53 | a | 0.92 | 45 |
| a | 0.90 | 49 | | | |
| a | 0.93 | 45 | | | |
| b | 0.32 | 46 | b | 6.31 | 46 |
| b | 0.45 | 53 | b | 0.35 | 60 |
| b | 0.80 | 52 | b | 0.90 | 58 |
| b | 0.93 | 45 | b | 0.92 | 45 |
| c | 0.32 | 47 | c | 0.31 | 47 |
| c | 0.45 | 53 | c | 0.35 | 59 |
| c | 0.80 | 52 | c | 0.45 | 61 |
| c | 0.90 | 49 | c | 0.55 | 61 |
| c | 0.93 | 46 | c | 0.92 | 45 |
| e | 0.55 | 53 | | | |
| e | 0.90 | 50 | | | |
| f | 0.50 | 37 | f | 0.40 | 39 |
| f | 0.70 | 38 | f | 0.60 | 40 |
| | | | f | 0.80 | 39 |
| h | 0.50 | 36 | | | |
| h | 0.70 | 36 | | | |

It should be noted that in the foregoing Examples 5 to 8, while the directions in which flames to be injected from the three or six oxygen burners are set based on the same standard (a to i) so as to clarify the difference to be brought about by the difference in the flame injecting directions of the oxygen burners, it is possible in the case where a plurality of oxygen burners are employed, to set the direction of injecting flames from each burner arbitrarily. For example, in the case where three oxygen burners are employed, these burners may be allowed to inject flames in different directions, for example, a, b and c in FIG. 9, respectively, and it is possible to combine suitably the flame injecting directions. In this case, a greater action of agitating the molten metal (turbulence of the molten metal) may be sometimes brought about compared with the case where flames are injected from the burners in the same direction, or reduction in the melting time can be sometimes achieved if the raw material is of poor melting property or if non-homogeneity of the molten metal is great.

EXAMPLE 9

Heat efficiency values when 1 ton of iron scraps (heavy scraps), 1 ton of copper scraps (pure copper electric wire scraps) and 400 kg of aluminum scraps (sash scraps) were melted were measured respectively using the metal melting furnace having the structure shown in FIG. 10.

An oxygen burner was attached to the melting section at the angle of 15 degrees with respect to the horizontal due to limitations to avoid interference between the burner attachments and the furnace body. Heat efficiency values were measured for an ordinary burner in which the flame injecting direction is in alignment with the burner axis (0 degree), for a burner in which the flame injecting direction is offset by 25 degrees from the burner axis and for a burner in which the flame injecting direction is offset by 40 degrees from the burner axis, respectively. Further, heat efficiency values were measured likewise, in the burner in which the flame injecting direction is offset by 40 degrees, by turning the burner every three minutes on the burner axis repeatedly, over the period since heating was started and until the metallic raw material all fell into the melting section, in the following order: 20 degrees to the right, 0 degree and 20 degrees to the left. The results are as shown in Table 8. The other conditions were the same as in Example 5.

TABLE 8

| | Offset angle | | | |
| --- | --- | --- | --- | --- |
| | 0 degree | 25 degrees | 40 degrees | 40 degrees + turning |
| Iron | 35 | 45 | 47 | 52 |
| Copper | 29 | 55 | 58 | 63 |
| Aluminum | 34 | 52 | 59 | 61 |

EXAMPLE 10

Heat efficiency values were measured in the same manner as in Example 9 employing, as the oxygen burner, a burner to which pulverized coal is supplied as a fuel, except that the burner was fitted at the angle of 20 degrees, and that the flame injecting direction was changed to 0 degree, 20 degrees and 40 degrees, respectively. The results are as shown in Table 9.

TABLE 9

| | Offset angle | | |
| --- | --- | --- | --- |
| | 0 degree | 20 degree | 40 degree |
| Iron | 37 | 45 | 47 |
| Copper | 34 | 57 | 61 |
| Aluminum | 36 | 53 | 60 |

EXAMPLE 11

Heat efficiency values when 1 ton of iron scraps (heavy scraps) were melted using the metal melting furnace having the structure shown in FIG. 11 equipped with three oxygen burners, to which a heavy oil and pure oxygen are supplied as a fuel and a combustion assisting gas respectively, fitted at a slant angle of 40 degrees with respect to the horizontal were measured. The melting section had a total height of 70 cm and an inner diameter of 90 cm, and the ceiling had a climbing angle of 30 degrees. Meanwhile, the heavy oil was supplied at a flow rate of 90 lit/hour in total to three oxygen burners. Oxygen was supplied at a rate of 180 $Nm^3$/hour. The other conditions were the same as in Example 2.

A carbon material was added after the raw material in the preheating section were dropped into the melting section to form slag, and the time required until the molten metal is tapped at 1,630° C. (the time until the raw material is fully melted after the raw material dropped into the melting section), iron yield and heat efficiency were measured. The carbon material employed here was a pulverized or granular coke having a carbon content of 90% or more, and the coke employed had a grain size of 3 mm under and was charged continuously in an amount of 100 g, 200 g and 300 g/minute, respectively; whereas the granular coke had a grain size of 10 to 30 mm and was charged in an amount of 1 kg/5 minutes. The results are shown in Table 10 together with those of the case where no carbon was added. Incidentally, the molten metal at the time of tapping was of a low carbon molten steel composition having a carbon content of 0.03 to 0.07%.

TABLE 10

|  | No carbon | Pulverized coke (g/min) | | | Granular coke |
|---|---|---|---|---|---|
|  |  | 100 | 200 | 300 |  |
| Time after falling (min) | 40 | 27 | 26 | 29 | 31 |
| Total melting time (min) | 65 | 53 | 51 | 53 | 55 |
| Iron yield (%) | 95 | 96 | 97 | 98 | 96 |
| Heat efficiency (%) | 39 | 48 | 51 | 49 | 47 |

EXAMPLE 12

Melting treatment was carried out employing the same melting furnace as in Example 11 by changing the slag basicity. As the metallic raw material, 1 ton of a mixture of steel scraps and pig iron ingot was employed. In this case, the greater the carbon concentration of the molten metal is, the easier becomes melting of the metal at a relatively low temperature to enable tapping at a low temperature. Slag basicity was adjusted employing a flux containing a calcined lime and siliceous sand. As the carbon material, the same powdery coke as employed in Example 11 was added continuously at a rate of 200 g/min. Foaming state was observed in each basicity, and the total melting time and heat efficiency were also measured. Incidentally, the foaming state was estimated provided that when foaming state was maintained for 50% or more of the treating time after the raw material had fallen is stable. The results are as shown in Table 11.

TABLE 11

| Pig iron ratio % | Temperature of falling metal °C. | Tapping temperature °C. | Carbon level at tapping % | Basicity — | Foaming state | Total melting time min | Heat efficiency % |
|---|---|---|---|---|---|---|---|
| 0 | 1300 | 1632 | 0.03 | 1.10 | Stable | 51 | 51 |
| 0 | 1320 | 1630 | 0.04 | 1.45 | Stable | 51 | 51 |
| 0 | 1330 | 1530 | 0.04 | 2.05 | Stable | 53 | 49 |
| 0 | 1325 | 1535 | 0.06 | 2.20 | Stable | 52 | 50 |
| 30 | 1250 | 1530 | 0.75 | 1.00 | Stable | 49 | 53 |
| 30 | 1250 | 1535 | 0.90 | 1.30 | Stable | 49 | 53 |
| 30 | 1240 | 1531 | 0.80 | 1.67 | Stable | 51 | 51 |
| 30 | 1248 | 1529 | 0.77 | 1.99 | Stable | 51 | 51 |
| 60 | 1205 | 1500 | 1.80 | 0.98 | Stable | 47 | 55 |
| 60 | 1200 | 1502 | 1.70 | 1.29 | Stable | 47 | 55 |
| 60 | 1205 | 1500 | 1.80 | 1.60 | Stable | 48 | 54 |
| 60 | 1220 | 1497 | 1.82 | 1.80 | Stable | 48 | 54 |
| 100 | 1135 | 1405 | 2.95 | 0.90 | Stable | 46 | 56 |
| 100 | 1125 | 1398 | 3.30 | 1.11 | Stable | 48 | 54 |
| 100 | 1100 | 1402 | 3.26 | 1.29 | Stable | 48 | 54 |
| 100 | 1110 | 1410 | 3.25 | 1.52 | Stable | 49 | 53 |
| 0 | 1330 | 1632 | 0.04 | 0.65 | Unstable | 64 | 40 |
| 0 | 1320 | 1630 | 0.03 | 3.05 | Unstable | 67 | 38 |
| 30 | 1250 | 1530 | 0.82 | 0.71 | Unstable | 63 | 41 |
| 30 | 1255 | 1535 | 0.79 | 2.75 | Unstable | 65 | 39 |
| 60 | 1205 | 1505 | 1.78 | 0.65 | Unstable | 61 | 42 |
| 60 | 1210 | 1500 | 1.80 | 2.50 | Unstable | 64 | 40 |
| 100 | 1120 | 1400 | 3.25 | 0.59 | Unstable | 59 | 43 |
| 100 | 1115 | 1404 | 3.20 | 2.30 | Unstable | 61 | 42 |

What is claimed is:

1. A metal melting furnace for melting a metallic raw material with a flame of an oxygen burner, said melting furnace comprising:

a melting section provided with an oxygen burner;

a preheating section for preheating said metallic raw material located above said melting section;

a reduced section, having an inner diameter smaller than those of said melting section and of said preheating section, located between said melting section and said preheating section; and a splitting section, including a carbon containing refractory material, for separating said melting section and said preheating section.

2. The metal melting furnace according to claim 1, wherein said preheating section has a cross-sectional area of 1.4 to 5 times as large as that of said reduced section.

3. The metal melting furnace according to claim 1, wherein said preheating section has a substantial volume of 0.4 to 3 times as large as that of said melting section.

4. A metal melting furnace for melting a metallic raw material with a flame of an oxygen burner, said melting furnace comprising:

a melting section provided with an oxygen burner;

a preheating section for preheating said metallic raw material located above said melting section;

a reduced section, having an inner diameter smaller than those of said melting section and of said preheating section, located between said melting section and said preheating section; and a splitting section for separating said melting section from said preheating section, said splitting section being provided with a water-cooling jacket.

5. The metal melting furnace according to claim 1, wherein a water-cooling jacket constitutes a portion upper than the furnace wall of said melting section; the angle of the inner wall surface of said water-cooling jacket extended from the top of said furnace wall to said reduced section is set to be within the range of 20 to 60 degrees with respect to the horizontal; with said oxygen burner penetrating said water-cooling jacket into said melting section.

6. The metal melting furnace according to claim 1, wherein the flame of said oxygen burner is injected toward a circle drawn, on the bottom of said melting section, on a point located at a distance of 0.2 times the distance, between the center of gravity and the inner wall surface where said oxygen burner is fitted, closer from the center of gravity toward that inner wall surface; said circle having a diameter of 0.6 times the distance between said inner wall surface where said oxygen burner is fitted and the opposing inner wall surface.

7. The metal melting furnace according to claim 1, wherein the position at which said oxygen burner is attached is at a height such that the portion of said melting section below the flame discharging hole of said oxygen burner may have a volume of 0.35 to 0.9 times the entire volume of said melting section.

8. The metal melting furnace according to claim 1, wherein said oxygen burner is an eccentric burner which is attached to said melting furnace to be able to turn on the burner axis.

9. The metal melting furnace according to claim 1, further comprising a secondary combustion oxygen nozzle at an upper position of said melting section.

10. The metal melting furnace according to claim 1, further comprising a molten metal agitating nozzle at the bottom of said melting section.

11. A method of melting a metallic raw material with a flame of an oxygen burner, which comprises:

employing a metal melting furnace consisting of a melting section provided with said oxygen burner, a preheating section for preheating said metallic raw material located above said melting section and reduced section, having an inner diameter smaller than those of said melting section and of said preheating section, located between said melting section and preheating section, wherein said preheating section has a cross-sectional area of 1.4 to 5 times as large as that of said reduced section; and employing an eccentric burner as said oxygen burner which is turned on the burner axis depending on the melting stage of said metallic raw material.

12. A method of melting a metallic raw material with a flame of an oxygen burner, which comprises:

employing a metal melting furnace consisting of a melting section provided with said oxygen burner, a preheating section for preheating said metallic raw material located above said melting section and reduced section, having an inner diameter smaller than those of said melting section and of said preheating section, located between said melting section and preheating section, wherein said preheating section has a cross-sectional area of 1.4 to 5 times as large as that of said reduced section; and charging a carbon material to a molten slag present on the bath surface during the operation of melting said metallic raw material to effect foaming of said molten slag.

13. The method of melting a metallic raw material according to claim 12, wherein the basicity $\gamma$ of said molten slag is controlled to be within the range as expressed by the following equation: $0.001T-0.6 \leq \gamma \leq 0.0025T-1$, wherein T represents a molten metal treating temperature (°C.).

14. The metal melting furnace according to claim 4, wherein said preheating section has a cross-sectional area of 1.4 to 5 times as large as that of said reduced section.

15. The metal melting furnace according to claim 4, wherein said preheating section has a substantial volume of 0.4 to 3 times as large as that of said melting section.

* * * * *